United States Patent
Arocha et al.

(10) Patent No.: US 9,789,853 B2
(45) Date of Patent: Oct. 17, 2017

(54) CARGO ANTI-THEFT PROTECTION SYSTEMS, APPARATUS, AND METHODS

(71) Applicant: Nuve, Inc., Austin, TX (US)

(72) Inventors: Antonio Arocha, Austin, TX (US); Elom Tsogbe, Austin, TX (US); Michael Greig, Austin, TX (US)

( * ) Notice: Subject to any disclaimer, the term of this patent is extended or adjusted under 35 U.S.C. 154(b) by 149 days.

(21) Appl. No.: 14/785,595

(22) PCT Filed: Apr. 16, 2015

(86) PCT No.: PCT/US2015/026169
§ 371 (c)(1),
(2) Date: Oct. 19, 2015

(87) PCT Pub. No.: WO2015/161073
PCT Pub. Date: Oct. 22, 2015

(65) Prior Publication Data
US 2016/0082925 A1    Mar. 24, 2016

Related U.S. Application Data

(60) Provisional application No. 61/980,470, filed on Apr. 16, 2014.

(30) Foreign Application Priority Data

Sep. 9, 2014    (WO) ................ PCT/US2014/054796

(51) Int. Cl.
*B60R 25/23*    (2013.01)
*B60R 25/10*    (2013.01)
*B60R 25/34*    (2013.01)

(52) U.S. Cl.
CPC .......... *B60R 25/23* (2013.01); *B60R 25/1001* (2013.01); *B60R 25/34* (2013.01)

(58) Field of Classification Search
CPC ................ B60R 2011/0096; B60R 2011/0098
See application file for complete search history.

(56) References Cited

U.S. PATENT DOCUMENTS

| 6,133,649 A * | 10/2000 | Iwamoto ................. B60R 25/04 |
| | | 180/287 |
| 2004/0207525 A1* | 10/2004 | Wholey .................. B60R 25/10 |
| | | 340/568.2 |

(Continued)

FOREIGN PATENT DOCUMENTS

SE    EP 1584526 A2 * 10/2005    ......... B60R 25/1001

OTHER PUBLICATIONS

International Search Report/Written Opinion Regarding PCT Application No. PCT/US15/026169.

*Primary Examiner* — Laura Nguyen
(74) *Attorney, Agent, or Firm* — The Villhard Patent Group

(57) ABSTRACT

Cargo anti-theft systems, apparatus, and related methods. Anti-theft controllers of embodiments are configured to sense the openings of cargo switches and to electronically operate locks responsive thereto. Moreover, the switches are mechanically coupled to the access points in manners such that the access points cannot be opened without opening the switches. Some controllers are configured to output signals indicative of openings of the switches while some are configured to unlock the locks only in pre-selected geozones. The pre-selected voltages, moreover, can differ from 12 VDC and can be user-selected. Furthermore, controllers can be configured to sense (modifiable) PINs associated with openings of the cargo switches. The controllers can include a coupler which securely couples it to the vehicle. It can also be configured to sense a position of the lock. Such control- (Continued)

lers, furthermore, can be configured to lock the lock responsive to the lock position and/or can comprise a battery.

16 Claims, 21 Drawing Sheets

(56) References Cited

U.S. PATENT DOCUMENTS

| | | | |
|---|---|---|---|
| 2008/0252084 A1* | 10/2008 | Francis | G09F 3/0335 292/317 |
| 2011/0018707 A1* | 1/2011 | Dobson | A45C 13/18 340/539.13 |
| 2014/0091931 A1* | 4/2014 | Cova | G08B 13/12 340/568.2 |

* cited by examiner

FIG. 1
(Cont'd)
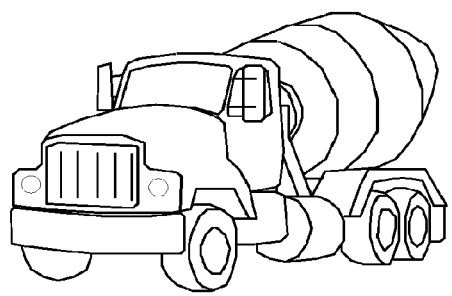
102
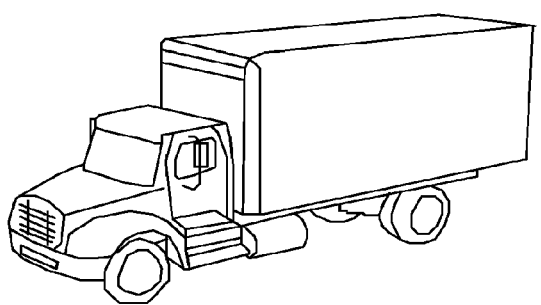
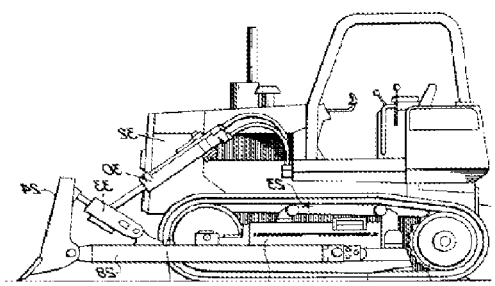
106
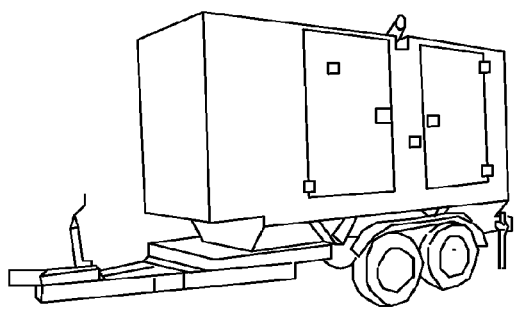
108
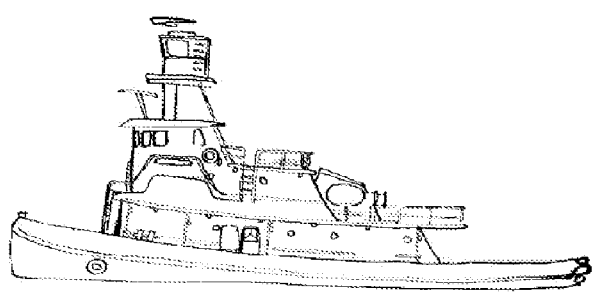

SENSOR WITH
CONNECTOR

STATIONARY
SENSOR

SENSER INSTALLED ON FUEL CAP

SENSOR INSTALLED ON FUEL FILTER

FUEL CAP SENSOR

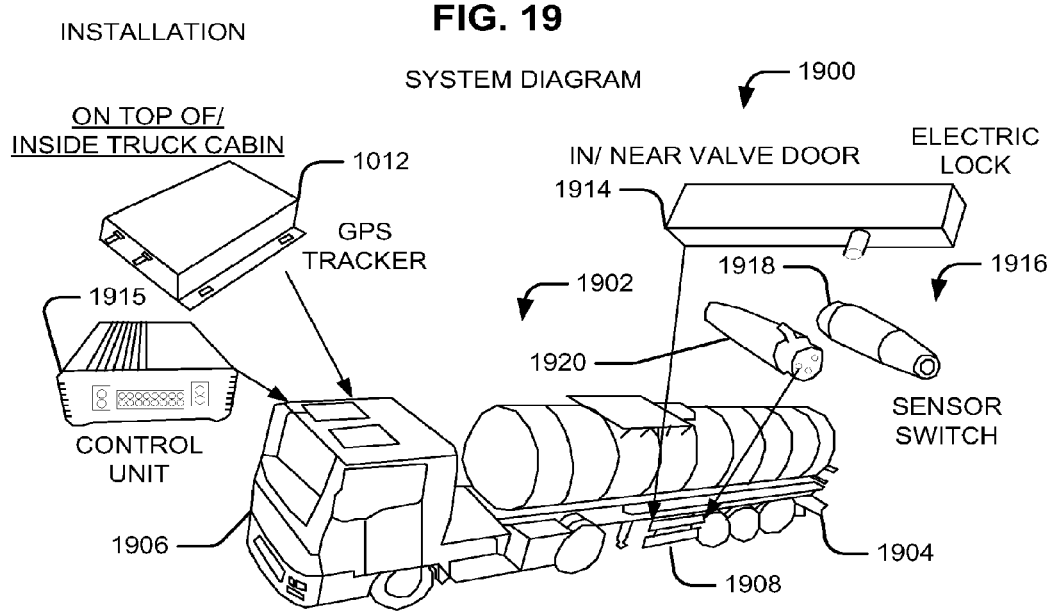
FIG. 19
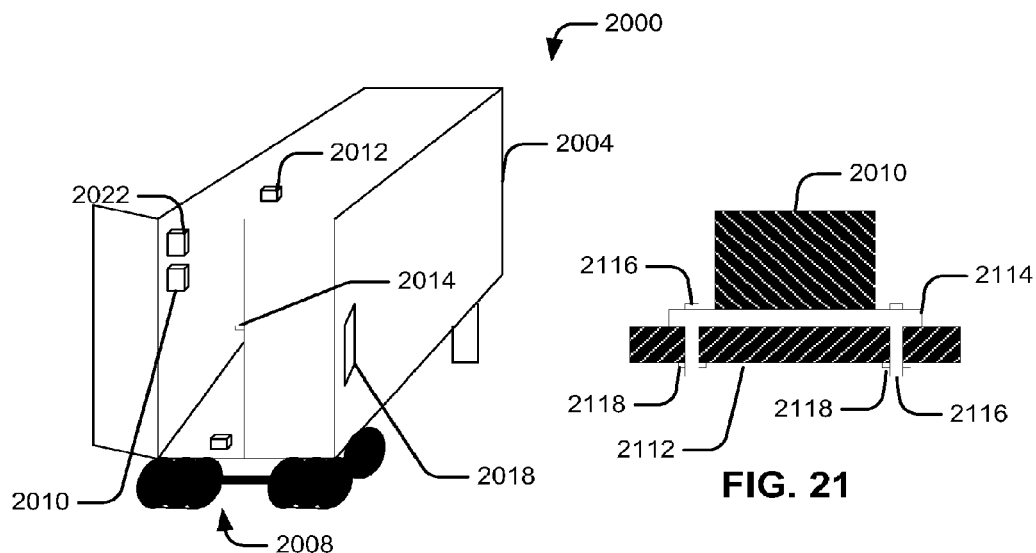
FIG. 20
FIG. 21

BASED ON FIG.14

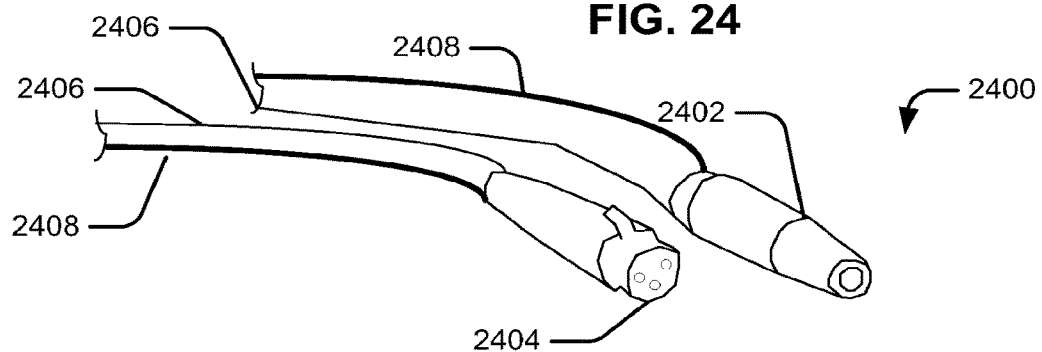
FIG. 24
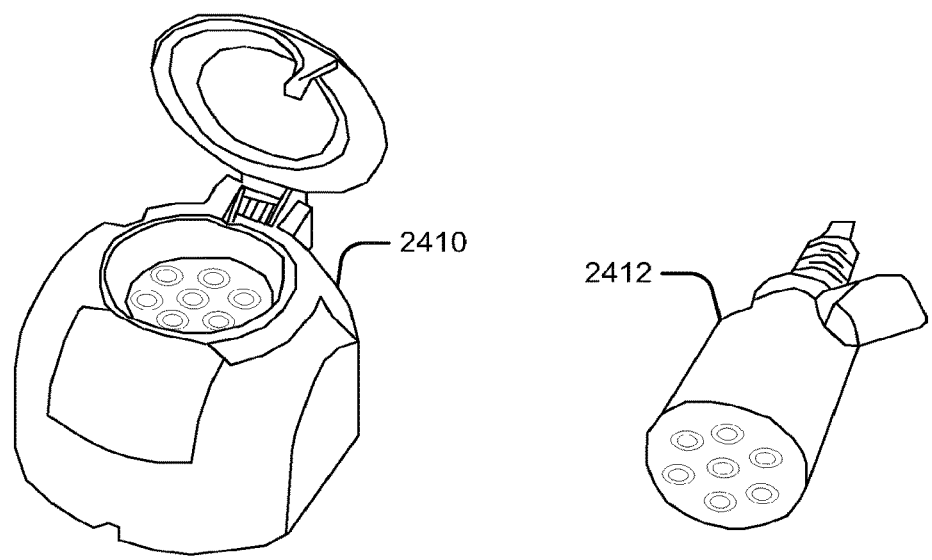

CARGO ANTI-THEFT PROTECTION SYSTEMS, APPARATUS, AND METHODS

CROSS REFERENCE TO RELATED APPLICATIONS

BACKGROUND

Theft of gasoline, diesel fuel, and/or other vehicular fuels represents a substantial loss to cargo carriers in many parts of the world. Notably, in many developing countries, fuel represents an easily sold commodity that cannot be traced and which garners a high return in the black market. Thus, parked vehicles stand as undefended targets for fuel thieves. Even attended vehicles, though, can be at risk particularly if the driver is "on the make."

Of course, the fuel contained in these vehicles can be accessed via the fuel fill cap (or simply "fuel cap"). A thief can remove the fuel cap, route a tube or hose through the adjoining fill tube, and siphon fuel from the tank. Moreover, vehicular fuel systems typically present a number of less conventional "entry points" through which a thief can access the fuel contained therein. More specifically, typical vehicular fuel systems include a fuel tank (sometimes with a drain fixture/feature), a fuel pump (often submerged, but sometimes external to the tank), a fuel filter, various valves, a recirculation line, test ports, flow rate sensors, and/or a connection to a carburetor (in older vehicles), or the fuel injectors (in most late model vehicles), and/or a fuel "rail" which feeds the fuel injectors. That list, by the way, is not exclusive but serves to illustrate that each system component has at least one mechanical/fluid coupling that can be tampered with to access the fuel. Additionally, there might be some such fluid couplings between otherwise separate tubes, pipes, hoses, etc. which convey fuel through the vehicle. All of these couplings, components, etc. represent fuel system "entry points" and render the fuel therein subject to theft.

Such risks, moreover, do not exist with land-based vehicles alone. Rather the cars, trucks, lorries, vans, etc. which exist on the roads represent just one category of susceptible vehicle. Aircraft (for instance, helicopters, prop-driven planes, jet planes, etc.), marine vehicles (for instance, boats, hovercraft, tugboats, crane boats, etc.) and other categories of vehicles also stand at risk of fuel-theft. Aviation fuel (av-gas, jet A, mogas) which sells at a premium compared to even automobile gasoline, not to mention diesel represents a particularly "rich" target at unguarded airports, airfields, and the like. Of course, elevated prices and/or scarcity (whether local, regional, or otherwise) aggravate the threat.

Similar considerations apply to cargo which the trucks and/or other vehicles might be carrying. For instance, in poor areas, food, water, beverages, etc. might be highly prized and deemed worthy of attempted theft and/or other types of misappropriation. More valuable cargo such as consumer electronic devices might be sought after with less than ethical characters willing to steal these products from their employers, others, etc. And, of course, rarer merchandise such as gold, jewelry, money itself (conveyed in armored vehicles) could become targeted for theft. Furthermore, whole shipments need not be stolen for a shipper to suffer significant losses particularly if viewed over time. For instance, even legitimate customers of the shipper might be tempted to take advantage of the lack of security typically present when a truck arrives at their facility. In such situations, some persons might remove their legitimately ordered cargo and then proceed to take more cargo than they ordered or are otherwise entitled to take. In the alternative, or in addition, such persons might fraudulently claim that cargo was missing from a shipment when in fact it was present. And, of course, other scenarios too numerous to list here can give rise to discrepancies associated with cargo shipments. Such issues extend beyond emerging countries. According to the FBI, cargo theft has reached an epidemic portion averaging up to 30$ billion lost annually in just the United States of America.

SUMMARY

The following presents a simplified summary in order to provide an understanding of some aspects of the disclosed subject matter. This summary is not an extensive overview of the disclosed subject matter, and is not intended to identify key/critical elements or to delineate the scope of such subject matter. A purpose of the summary is to present some concepts in a simplified form as a prelude to the more detailed disclosure that is presented herein. The current disclosure provides systems, apparatus, methods, etc. for detecting potential fuel theft and more particularly for detecting fuel theft related events associated with vehicles such as planes, boats, automobiles, and trucks among other vehicles.

Some embodiments provide fuel anti-theft systems for vehicles which possess fuel systems defining a plurality of fluid entry points. Systems of the current embodiment nominally include a pre-selected number of sensors which are positioned at the entry points. Each sensor defines a nominal/secure state and a potentially tampered-with state. The potentially tampered-with state is indicative of the sensor being absent. The actual states of the sensors combining to create an actual combined state of the sensors. In contrast, the nominal states of the pre-selected number of sensors combine to create a nominal combined state of the pre-selected number of sensors. Furthermore, a controller of the system senses the actual combined state of the sensors and determines whether the actual combined state of the sensors is the nominal combined state of the pre-selected number of sensors. Responsive thereto, the controller generates a signal which indicates whether all of the pre-selected number of sensors are present and un-tampered-with.

In accordance with various embodiments, the current disclosure also provides fuel anti-theft methods. Some such methods comprise a variety of activities including sensing a combined signal from a plurality of sensors positioned at entry points of a vehicle fuel system. Each sensor defines a secure state and a suspect state (indicative of the sensor being absent) in accordance with the current embodiment. Moreover, the secure sensor states of a number of the sensors nominally in the system combine to create a secure system state. Such methods also comprise determining whether the combined signal about equals the secure system state (for the number of sensors in the system) and outputting a corresponding signal.

If desired, the sensing of the combined signal can be via a vehicle chassis ground and/or the sensors can be nominally wired in parallel. In some situations a resistor contributes to the combined signal. In addition, or in the alternative, such methods can further comprise noting the location of the vehicle when the signal fails to indicate that the combined signal is indicative of the secure system state for the number of sensors.

Various embodiments provide fuel anti-theft controllers including a circuit and/or sensors which define nominal (secure) and tampered-with states. The tampered-with states are indicative of the sensor(s) being absent. The controllers of the current embodiment, moreover, sense a combined state of (all of a pre-selected number of) the sensors and determine therefrom whether all of the pre-selected number of sensors are present and secure. In some embodiments, the controller senses the sensors (which can be wired in parallel) via a vehicle chassis ground. If desired, a resistor (which is about electrically equivalent to one or more of the sensors) and/or a geo-positioning unit can be connected to the controller. The sensors can include normally open switches and clamps which close the switches when installed properly. The sensors can be secured by other means such as fasteners, cable ties, zip ties, adhesives, etc. Some sensors include grounding straps while others include ground return leads. In some embodiments, sensors are positioned at the vehicle fuel cap and/or fuel filter.

Various embodiments provide anti-theft controllers comprising cargo switch inputs, outputs, and circuits in communication therewith. The inputs of the current embodiment are configured to sense the grounds of the cargo vehicles on which they are installed through a cargo switch. Cargo switches of the current embodiment serve at least two purposes. More specifically, they provide an interface for access requests and they detect whether the door is shut or open. Systems of embodiments include other security feature such as infrared sensors, proximity sensors Hall effect sensors, RFID (Radio Frequency Identification) sensors, optical sensors, etc. to provide additional insight as to the state of the cargo switch and/or its environs. Further, some controllers are configured such that if a wire in an input circuit breaks (or is broken by someone), these controllers interpret that condition as indicative of tampering and thus raise an alarm.

Meanwhile, the outputs are configured to be in communication with electronically operated locks. The circuits are in communication with the inputs and the outputs and are configured to detect openings of the cargo switches via pre-selected voltages at the cargo switch inputs. Responsive thereto, moreover, the circuits are configured to activate the locks via the outputs. In the current embodiment the cargo switches are mechanically coupled to cargo access points on the cargo vehicles so that the cargo access points cannot be opened without opening the cargo switches.

In some embodiments the circuits further comprise geo-positioning outputs and the circuits are further configured to output a signal indicative of the opening of the cargo switch via the geo-positioning output. In addition, or in the alternative thereto, controllers can further comprise geo-zone inputs and are further configured to output signals to unlock the lock only in pre-selected geo-zones. In some situations the pre-selected voltage differs form 12 VDC and can be user-selected.

Furthermore, the controller can be further configured to sense a PIN (personal identification number) associated with openings and closings of the cargo switch, keypad, audio knock sequence, cellular phone (carried by the user), etc. In some of these cases, the controller can also be configured to change the PIN (Personal Identification Number). On the mechanical side of things, the controller can include or be coupled to a coupler which securely couples it to the cargo vehicle. It can also (or instead) comprise a lock position input and be configured to sense a position of the lock via it. Such controllers, furthermore, can be configured to output a signal indicating that the lock should lock responsive to the position of the lock. Some controllers, locks, and/or other system components moreover comprise a battery to power themselves.

To the accomplishment of the foregoing and related ends, certain illustrative aspects are described herein in connection with the annexed figures. These aspects are indicative of various non-limiting ways in which the disclosed subject matter may be practiced, all of which are intended to be within the scope of the disclosed subject matter. Other novel and/or nonobvious features will become apparent from the following detailed disclosure when considered in conjunction with the figures and are also within the scope of the disclosure.

BRIEF DESCRIPTION OF THE FIGURES

The detailed description is described with reference to the accompanying figures. In the figures, the left-most digit(s) of a reference number usually corresponds to the figure in which the reference number first appears. The use of the same reference numbers in different figures usually indicates similar or identical items.

FIG. 19 illustrates a cargo anti-theft system.
FIG. 20 illustrates another cargo anti-theft system.
FIG. 21 illustrates an installed anti-theft controller.
FIG. 24 illustrates a cargo switch and a pair of cab to trailer connectors.

DETAILED DESCRIPTION

This document discloses systems, apparatus, methods, etc. for detecting potential fuel theft and more particularly for detecting fuel theft related events associated with vehicles such as planes, boats, automobiles, and trucks among other vehicles.

Figure 1:
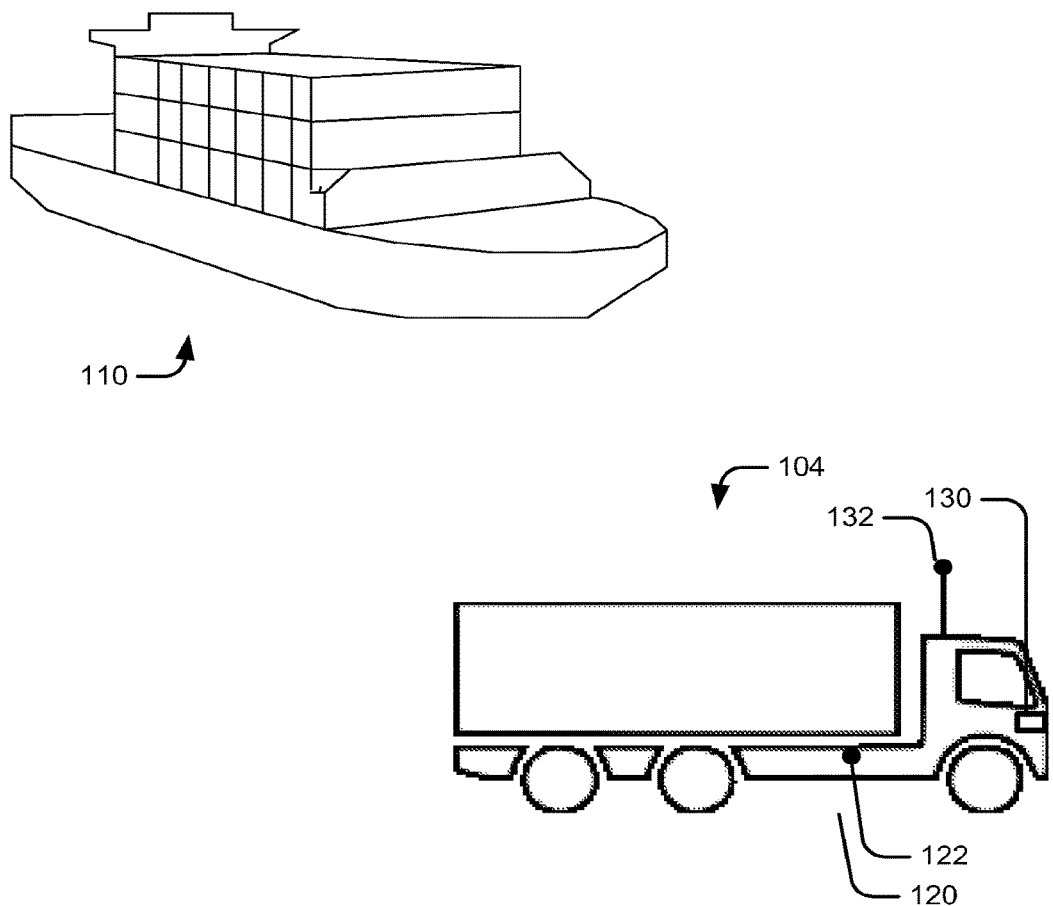
FIG. 1 illustrates vehicles subject to fuel theft.

FIG. 1 illustrates vehicles subject to fuel theft. More particularly, FIG. 1 illustrates a concrete truck 102, a delivery truck 104, a bulldozer 106, a generator trailer 108, a ship 110, a fuel tank 120, an entry point 122, an anti-theft controller 130, and an antenna 132. These vehicles 102, 104, 106, 108, and 110 (among others) have a number of common traits. For one thing, they all contain fuels of various types which are all at least somewhat valuable. Moreover, the owners, operators, and other users associated with them take and/or leave them at locations which are often remote from other users and at which witnesses of a potential fuel theft might be far and few between. In the alternative, or in addition, many potential witnesses might not care enough to report suspicious activities or might even be sympathetic to those who would undertake such actions. Thus, these vehicles and/or the fuel in them are susceptible to fuel-theft from time to time.

For instance, consider the delivery truck 104. A driver often takes the delivery truck 104 on routes delivering and/or picking up various goods and/or delivering various services. Those routes might take the driver into areas far from a depot, station, or other location at which the truck is normally garaged, parked, etc. Those garages are typically staffed by the owner of the delivery truck 104 and/or employees or other agents of the owner. Thus, if a driver desires to take fuel from the delivery truck 104 in a manner not authorized by the owner, it is likely that the driver will wait to do so until they are on a route or supposedly on a route.

When they feel ready to take the fuel, the driver will typically stop the truck in a spot "suitable" for doing so and exit its cab. They will then often find an entry point 122 in the fuel system of the delivery truck 104 through which to access the fuel. For instance, they will take the fuel cap off of the fuel tank 120, insert a hose into the fuel tank 120, and siphon fuel from the fuel tank 120. Subsequently, such drivers will either put the fuel to their personal use, sell it, or make some other unauthorized use of the fuel. Such fuel thefts (alone and/or cumulatively) can represent a significant loss for the owner of the delivery truck 104. Of course, any vehicle which contains fuel stands at risk of such thefts. Indeed, it was estimated in 2013 that fuel thefts cost the economy of Mexico alone 2-4 Billion $US annually. See The Aftermath Of Mexico's Fuel Theft Epidemic: Examining The Texas Black Market And The Conspiracy To Trade In Stolen Condensate by Luke B. Reinhart, May 9, 2014.

Some embodiments provide systems for detecting potential fuel thefts and for alerting owner and/or other users of such activities. As FIG. 1 further shows the fuel anti-theft controller 130 can be mounted in, or on, the delivery truck 104 to detect activity which might indicate that someone might have stolen fuel, is stealing fuel, and/or is about to steal fuel. The fuel anti-theft controller 130 is typically connected to a plurality of sensors located at entry points to the vehicle's fuel system and monitors the same for potential tampering.

The sensors cause the fuel anti-theft controller 130 to generate a signal should some activity, condition, etc. cause one or more of the sensors to change state from a secure state to a tampered-with state or should a sensor appear to be missing from the system (whether suddenly or not). Moreover, the fuel anti-theft controller 130 of embodiments communicates and/or cooperates with an onboard geo-positioning unit, computer, etc. to time stamp and/or location stamp such occurrences. Further still, the fuel anti-theft controller 130, the geo-positioning system 132, and/or some other device on the delivery truck 104 can transmit information regarding such occurrences to remote owner/operators, central alarm consoles, etc.

Figure 2:
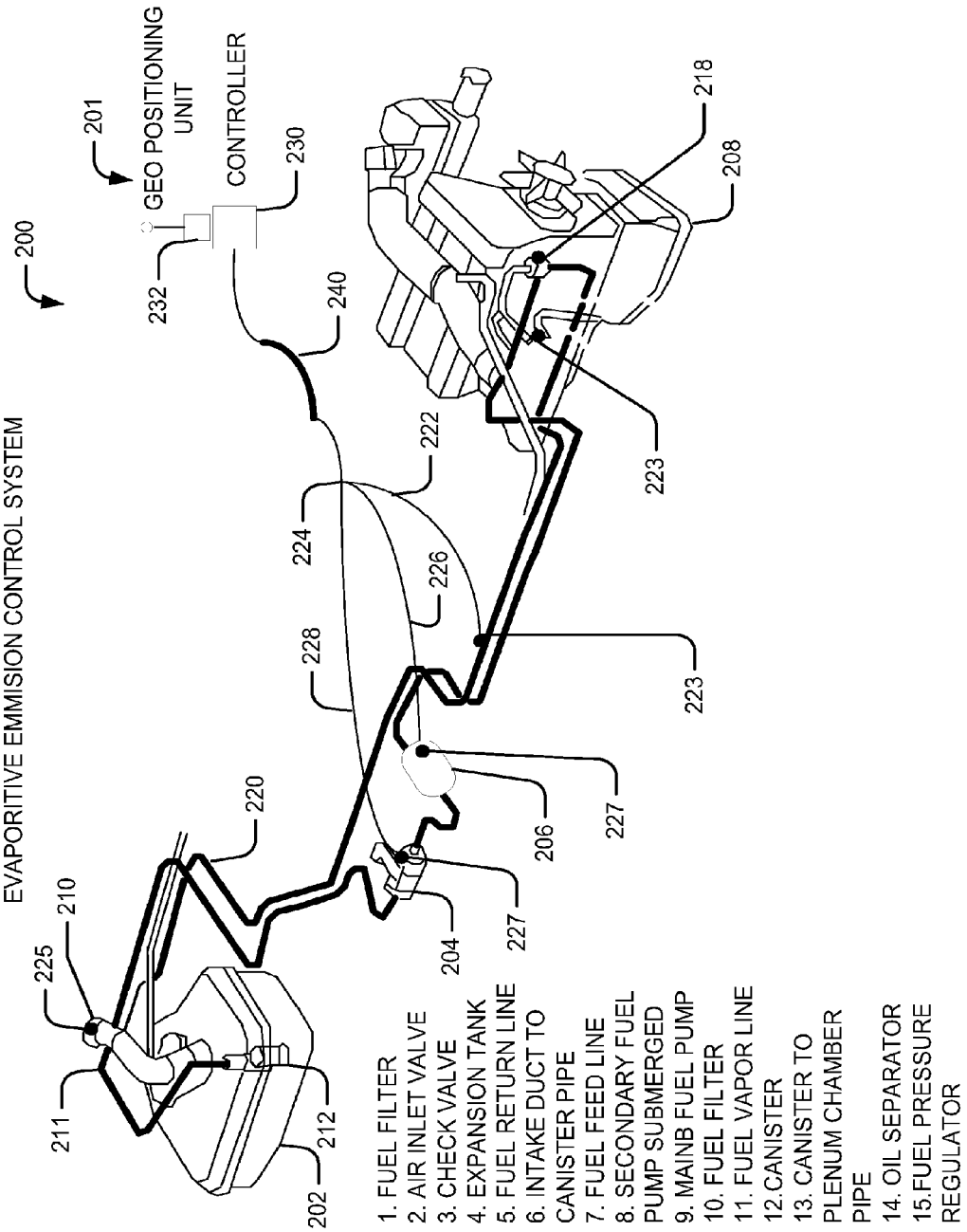
FIG. 2 illustrates a fuel anti-theft system installed on a vehicle.

FIG. 2 illustrates a fuel anti-theft system installed on a vehicle. More particularly, FIG. 2 illustrates a fuel system 200, the anti-theft system 201, a fuel tank 202, a fuel pump 204, a fuel filter 206, an engine 208, a fuel cap 210, a fuel inlet (tube, pipe, etc.) 211, a secondary fuel pump 212, a fuel pressure regulator 218, a fuel return line 220, a coupling 222, sensors 223, 225, and 227, cables 224, 226, and 228, a controller 230, a geo-positioning unit 232, and a conduit 240. At this juncture, a brief discussion of the fuel system 200 of a typical vehicle might be beneficial.

As those skilled in the art will appreciate, most vehicles include a fuel system 200 to deliver fuel stored in a fuel tank 202 to the engine 208. Those fuel systems 200 are replete with entry points making the fuel therein susceptible to theft. More particularly, in commercial vehicles in particular, the fuel tank 202 can contain hundreds of gallons of fuel, each gallon of which being valued at several US dollars as of this writing.

The fuel cap 210 presents one of the many entry points associated with a typical vehicular fuel system. Moreover, the fuel cap 210 is usually located in an easily accessible location making it particularly attractive to thieves as an entry point. Moreover, often the fuel inlet 211 and fuel tank 202 are formed integrally with one another (or are welded together or otherwise permanently coupled). Yet, in vehicles in which they are separate components, the coupling between these two components represents another entry point in that the coupling can be disconnected allowing fuel to drain out of (or be pumped out of) the fuel system 200. Many fuel tanks 202, furthermore, contain a secondary fuel pump 212 or have it mounted in close proximity thereto. Thus, the secondary fuel pump 212 of some vehicles presents another system coupling (or even a pair thereof), and therefore, an entry point.

From the fuel tank 202, a fuel line runs to another fuel system component (as illustrated by FIG. 2) such as the primary fuel pump 204. Again, this component presents another pair of entry points rendering the fuel vulnerable to theft. The fuel filter 206, fuel pressure regulator 218, engine 208, and fuel return line 220, all include couplings that also render the fuel vulnerable. Moreover, vehicle manufacturers sometimes find it desirable to use two or more pieces of tubing, piping, hose, etc. to route fuel from one component to another. As a result, a coupling 222 can appear in many places apart from the discrete components illustrated by FIG. 2. As noted, therefore, typical fuel systems 200 are replete with entry points which render the fuel contained in the systems vulnerable to theft.

With continuing reference to FIG. 2, embodiments provide anti-theft systems 201 on vehicles such as delivery truck 104. The anti-theft system 201 of the current embodiment includes the controller 230, the geo-positioning unit 232, the sensors 223, 225, and 227, and the cables 224, 226, and 228 among other things. The controller 230 of the current embodiment resides in the crew cabin of the vehicle and, more particularly, can be mounted in the dashboard or at some location relatively inaccessible to users of the vehicle. The geo-positioning unit 232 can also reside in the cabin although, if desired, it can be located in an accessible area of the cabin. In the alternative, or in addition, the geo-positioning unit 232 can be a component of the controller 230. The sensors 223, 225, and 227 are clamped to the couplings 222 and/or other components of the fuel system 200 which represent entry points. The cables 224, 226 and 228 run from the sensors 223, 225, and 227 to the controller 230 and also (in the current embodiment) run through conduits 240.

The cables 224, 226, and 228 provide electrical conductivity between the sensors 223, 225, and 227 and the controller 230 and, therefore, allow the controller 230 to sense the state of the sensors (as a group in the current embodiment). Furthermore, the conduits 240 provide protection to the cables 224, 226, and 228 from mechanical damage arising from abuse, neglect, outright tampering, etc. The conduits 240 (and, for that matter, the cables 224, 226, and 228) can be disguised to appear to be OEM (original equipment manufacturer), after-market, etc. equipment that has been on the vehicle for some time. The conduits 240 can be (among other things) a piece of cable sheathing, braided hose, corrugated conduit (of type SM-1216-BK and available from Sealcon LLC located on 7374 S. Eagle St, Centennial CO 80112 etc. and/or can be smeared with dirt, grease, grime, etc. normally available on the vehicle or created for such purposes.

As is further disclosed with reference to FIGS. 3 and 5-10, the sensors 223, 225, and 227 include normally open switches and clamps. The clamps are configured to hold the sensors against the various couplings/components and (by doing so) to urge the switches toward their closed positions. It is these closed positions (collectively, in the current embodiment) which indicate that the fuel system 200 is secure and/or un-tampered-with. Indeed, should even one of the switches open (or a sensor disappear from the anti-theft system 201), the controller 230 of the current embodiment will interpret that event as an indication that some user might be tampering with the fuel system 200 and/or attempting to gain access to the fuel via a monitored entry point/coupling/component.

Figure 3:
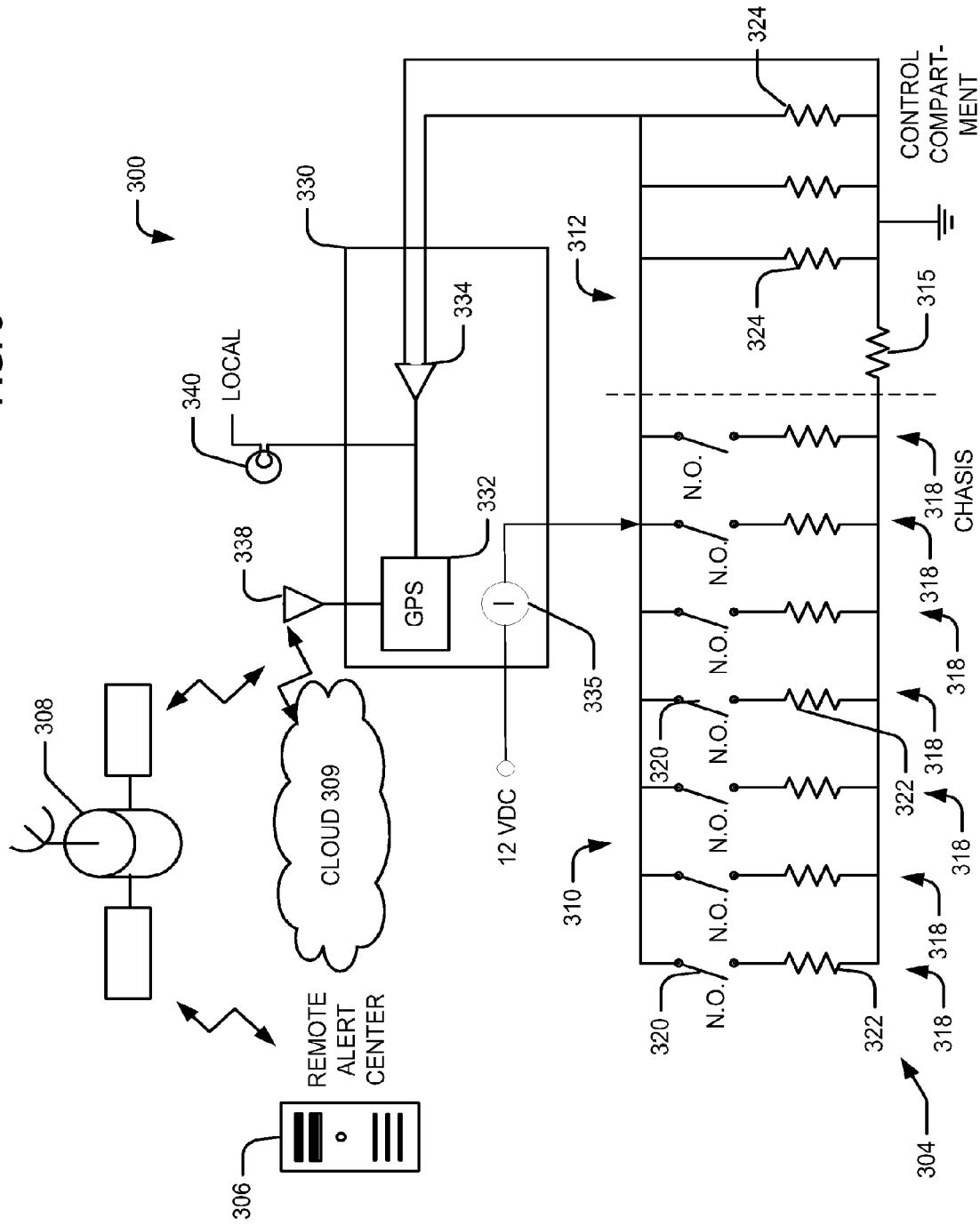
FIG. 3 schematically illustrates a fuel anti-theft system.

FIG. 3 schematically illustrates a fuel anti-theft system. More particularly, FIG. 3 illustrates an anti-theft system 300, an exterior subsystem 304, a remote alert center 306, the Internet "Cloud," a satellite 308, a sensor network 310, a set of resistors 312, sensors 318, sensor switches 320, sensor resistances 322, resistors 324, a controller 330, geo-positioning unit 332, a comparator 334, an antenna 338, and a local indicator 340. If desired a processor could be used instead of, or in addition to the comparator 334. In such cases, the processor could be configured with an analog input to sense the resistors and/or to determine whether the system is secure or has potentially been tampered with.

Thus, the anti-theft system 300 allows the controller 330 to communicate with the remote alert center 306 via the Cloud 309 and/or via a geo-positioning system including its satellites 308 and/or other infrastructure). If the controller 330 should issue an alert, therefore, the remote alert center 306 can receive the alert via either the cloud, the geo-positioning system, and/or some other telecommunications system (such as a cellular telephone system). Users and/or servers, computers, etc. in communication with the remote alert center 306 can monitor, react to, data mine, etc. these alerts and/or take corrective action. For instance, a vehicle owner could investigate the alerts, place the vehicle/driver under surveillance, etc.

With continuing reference to FIG. 3, the controller 330 resides on a vehicle as does much of the rest of the anti-theft system 300 of the current embodiment. For instance, each of the sensors 318 resides on the vehicle and comprises a normally open switch 320 and often some (inherent) internal resistance 322. Of course, that internal resistances 322 might be associated with internal interconnects of the sensors 318, its external wiring, connections there between, etc. However, in some embodiments, various sensors 318 comprise resistors of about 10 k-ohm, 5.1 k-ohm or 3.3 k-ohm with a 1% tolerance. As a result, each sensor 318 of the current embodiment will nominally have two states: a secure state and a potentially tampered-with state. In the secure state, the sensors 318 have their normally open switches 320 clamped closed by a clamp which secures the sensors on their respective components. Thus, the sensor 318 (wired in parallel with the other sensors 318) contributes its conductance/resistance 322 to the overall sensor network 310. But, in the potentially tampered-with state, the normally open switches 320 are open so that the sensors 318 appear to be electrical "open" paths thereby contributing no conductance and/or an infinite resistance to the sensor network 310.

Thus, when an anti-theft system 300 is installed and operating nominally on a vehicle, all of the switches 320 of the sensors 318 are held closed by the clamps and are sensed accordingly by the controller 330. But, if one or more sensors 318 are tampered-with, a corresponding number of switches 320 are likely to open thereby changing the overall resistance/conductance of the sensor network 310. Furthermore, the controller 330 (and/or its comparator 334) can be configured to sense whether the nominal conductance/resistance of the sensor network 310 is present or whether it has been altered. More specifically, the comparator 334 can be configured to produce a signal based on whether or not a known/pre-selected number of sensors 318 are present with their normally open switches 320 in the closed position.

Thus, the expected, overall, combined resistance/conductance of the sensor network would be:

$$R_{secure} = 1/n * R_{sensor}$$

Where:
$R_{secure}$ is the expected, overall resistance of the sensor network,
n is the pre-selected number of sensors 318 (resistances 322), and
$R_{sensor}$ is the resistance 322 of one sensor 318.

A power supply 335 (internal to the controller 330 of the current embodiment) can supply a trickle current to the sensor network 310. Furthermore, the comparator 334 can be configured to monitor the sensor network 310 for changes in the voltage across the sensor network 310 that correspond to the pre-selected number of sensors 318 being in their secure state and present in the sensor network 310. Of course, any resistance 315 associated with the chassis ground path can be accounted for in this determination by reference to the following equations:

$$R_{expected} = R_{secure} + R_{chassis}$$

Where:
$R_{expected}$ is the expected resistance and
$R_{chassis}$ is the resistance 315 of the chassis ground path.
And $$V_{expected} = I_{controller} * R_{expected}$$

Where:
$V_{expected}$ is the expected voltage and
$I_{controller}$ is the current supplied by the controller.

Thus, should the voltage sensed by the comparator 334 increase by about the amount associated with one of the switches 320 opening (or a sensor 318 being removed from the sensor network 310), the controller 330 can generate a signal indicative of potential tampering with the fuel system 200. Of course, the set point of the comparator 334 can be adjusted to account for tolerances associated with the foregoing parameters. Note that if the chassis resistance 315 is low, that voltage change would correspond to an increase of the resistance of the sensor network of:

$$\Delta R_{tamper} = R_{expected} - t/R_{secure};$$

$$\Delta V_{tamper} \geq I_{controller} * \Delta R_{tamper}; \text{ or}$$

$$V_{tamper} = V_{expected} \Delta V_{tamper}$$

Where t is the number of open/missing sensors

Since there might be scenarios in which users might want to install more sensors 318 than the number that a particular controller 330 is configured for, the set point of the comparator 334 can be adjusted downward by an amount corresponding to the addition of additional sensors 318 (and their additional conductances across the parallel sensor network 310). Of course, an additional controller 330 could be added to the anti-theft system 300 to provide capacity for additional sensors 318. Should users wish to use fewer than the pre-selected number of sensors 318, then users can place a corresponding number (and value) of resistors 324 across the inputs to the controller 330 to emulate the un-installed sensors 318. Those resistors 324, moreover, could be in the same (or another) secure location as the controller 330 itself. In other embodiments, the resistors 324 could be supplied via DIP (dual in-line) switches or similar devices in or associated with the controller 330. In the alternative, or in addition, the unused sensors 318 could be connected to the controller 330 and clamped such that the normally open switches 320 remain closed.

In some embodiments, the controller 330 is configured to work in conjunction with 10 (ten) sensors 318. Moreover, in the current embodiment, each sensor 318 has a resistance of approximately 10 k-ohm. Thus, the sensor network 310 has an electrically equivalent resistance of 1 k-ohm. Table 1, below, lists electrically equivalent resistances for sensor networks 310 having various pre-selected numbers of sensors 318 and lists electrically equivalent resistances for sensor networks 310 (of the current embodiment) with various numbers of open switches 320.

TABLE 1

| No. of Sensors | No. of Open Sensors | Resistance (k-ohm) |
|---|---|---|
| 1 | 9 | 10 |
| 2 | 8 | 5 |
| 3 | 7 | 3.33 |
| 4 | 6 | 2.5 |
| 5 | 5 | 2 |
| 6 | 4 | 1.67 |
| 7 | 3 | 1.43 |
| 8 | 2 | 1.25 |
| 9 | 1 | 1.11 |
| 10 | 0 | 1 |

Thus, should a user attempt to tamper with the fuel system 200, the controller 330 would sense it. For instance, removing one of the sensors 318 (either physically or electronically) from the sensor network/anti-theft system 201 would cause the corresponding electrical path to open thereby increasing the voltage to beyond the comparator 334 set point. Unclamping a sensor 318 would open the switch 320 leading to the same result. Attempting to first (before otherwise tampering with a fuel system) place a resistor of the same resistance as the sensor resistance 322 would result in a decrease in voltage which could cause the comparator 334 (if configured to sense voltages outside of a band) to sense an attempt to tamper with the fuel system 200 also (even if temporarily). And comparators 334 of some embodiments could be configured to latch the output signal in such situations.

With ongoing reference to FIG. 3, the signal output by the comparator 334 could serve several purposes. For one such purpose, it could cause a local indicator 340 to signal potential tampering. Of course, some embodiments either do not provide a local indicator 340 or provide it at a location not accessible to the normal users of the vehicle (for instance, the driver). The local indicator 340 could be hidden in a locked compartment or it could be provided within the housing of the controller 330 and, thus, available only to service technicians and/or others with the proper authority/tools to open the controller 330. The comparator signal could also be communicated to the geo-positioning unit 332.

The geo-positioning unit 332 could be configured to perform a variety of activities. For instance, it could (responsive to the comparator 334 signal) time and/or location stamp the occurrence(s) of the signal. Furthermore, the geo-positioning unit 332 could transmit such information to the remote alert center 306 via some telecommunications system. Additionally, or in the alternative, the geo-positioning unit 332 could track the location, speed, movement, lack of movement, etc. of the vehicle and transmit such information to the remote alert center 306. Thus, the anti-theft system 300 of embodiments can alert users (such as owners) to potential tampering with the fuel systems 200 of various vehicles.

Figure 4:
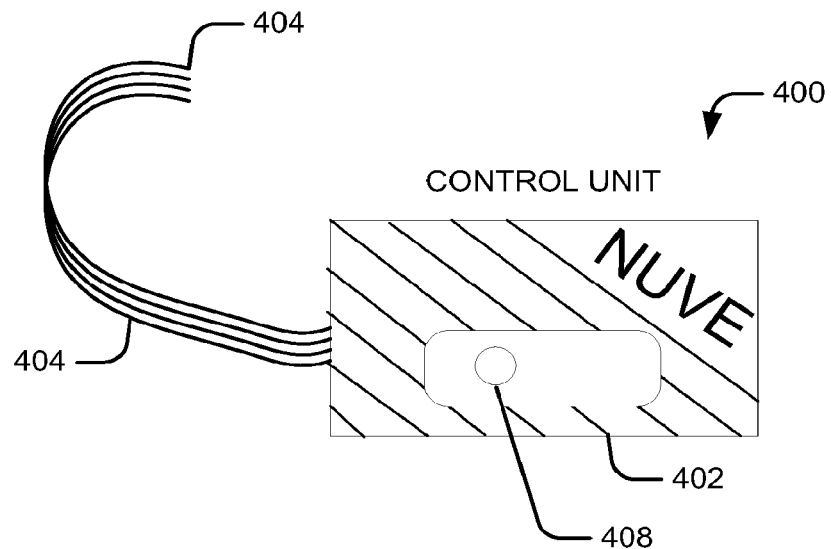
FIG. 4 illustrates a fuel anti-theft controller.

FIG. 4 illustrates a fuel anti-theft controller. The controller 400 of the current embodiment includes a tamper-resistant housing 402 and a number of leads 404 hardwired to the controller 400. The tamper-resistant housing 402 can be any sort of housing sufficient to either prevent users from physically entering the housing or at least sufficiently strong that most significant attempts to do so would leave pry marks, dents, scrapes, etc. on the housing. Thus, attempts to enter the controller 400 (and/or alter its internal components such as the comparator 334) could be readily evident upon inspection of the housing. The leads 404 can also contribute to the security of the anti-theft system 300. For instance, internal to the tamper-resistant housing 402, they can terminate in soldered, brazed, etc. connections to a PCB (printed circuit board) or otherwise be secured against un-detectable removal from the controller 400.

Moreover, in some embodiments, the leads 404 correspond in number to the pre-selected number of sensors 318. For instance, in embodiments in which every sensor 318 communicates with the controller 400 via a positive and a (ground) return lead, the controller 400 will have 2n leads (where "n" is the pre-selected number of sensors 318). However, it might be the case that one or more sensors 318 will use the chassis ground as a return path. In such situations, the number of leads 404 will be reduced accordingly and the associated set of sensors 318 will be selected with a number of return leads appropriate for controllers configured in that manner.

Additionally, or in the alternative, the controller 400 includes the local indicator 408. That local indicator 408 could be any indicator which can indicate that a tampering event has been detected (and/or is ongoing whether latched or not). For instance, the local indicator 408 could be a light, LED (light emitting diode), counter, blowable fuse/link, etc. If the controller 400 is in a secure location (for instance, "buried" in a dashboard) then the local indicator 408 will be correspondingly inaccessible to most users such as the vehicle driver. Of course, the local indicator 408 could be replaced/augmented with a jack, connector, etc. allowing for a connection of the controller 400 to an external event indicator.

Figure 5:
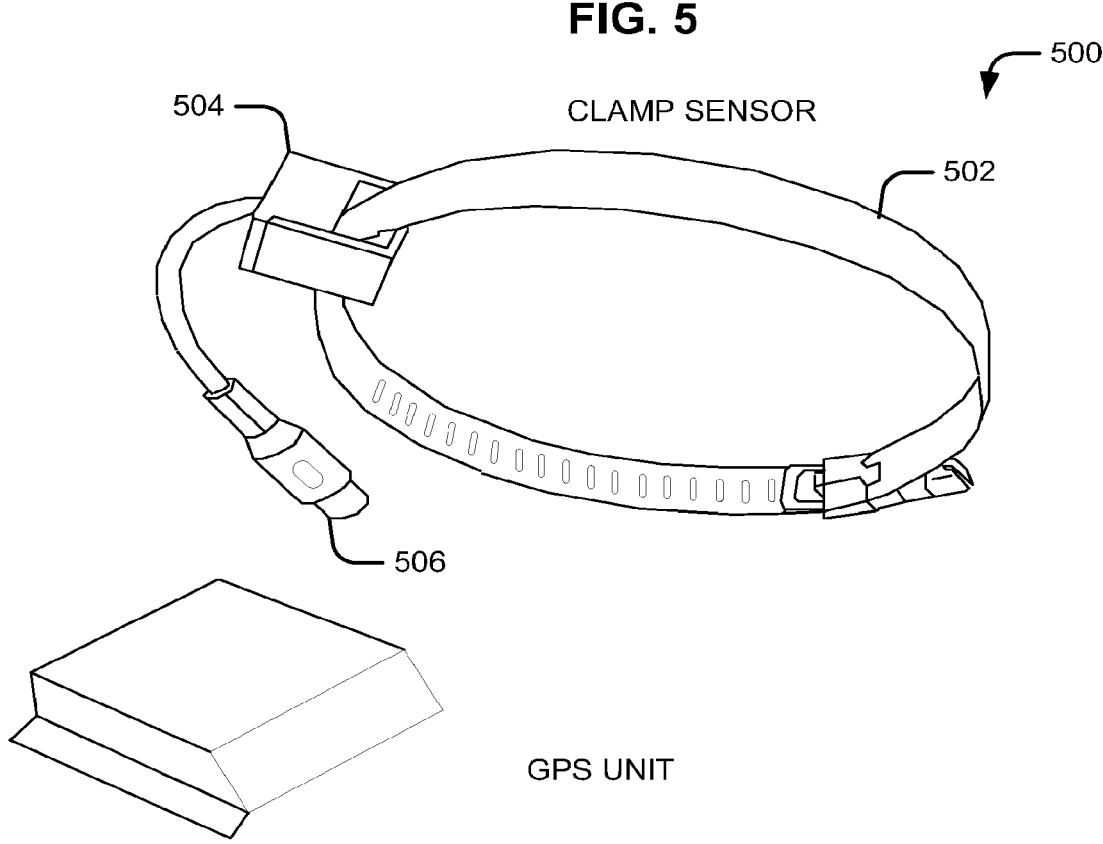
FIG. 5 illustrates a fuel anti-theft clamp sensor.

FIG. 5 illustrates a fuel anti-theft clamp sensor. The clamp sensor 500 of the current embodiment comprises a pipe clamp 332, a band clamp 502, zip lock tie, etc. capable of securing the sensor 500 to a fuel system component such as those illustrated by FIG. 2. The clamp 502 can also, when clamped, exert sufficient force on the switch 504 so as to close it (particularly if the switch 504 is a normally open switch). The switch 504 can be a normally open switch and can be positioned relative to the clamp 502 such that the clamp 502 can clamp it between the clamp and the component to which the sensor 500 is clamped. In the alternative, or in addition, the bulk of the switch 504 can be located on the outside of the clamp 502 with the actual electrical/mechanical switch and/or an actuator operatively coupled thereto positioned within the clamp (and subject to being clamped in the electrically "closed" position). Note, also that the sensor could also house a resistor to set the resistance 322 of the sensor 500 to a desired value if desired. Of course, the switch 504 (and resistor therein) could be wired to the connector 506 which can include conductors for both the positive and ground return paths associated with the sensor 500. For instance, the connector 506 of embodiments can be a model no. 45-4610 type connector available from LKG industries, Inc located on 3660 Publishers Dr, Rockford, Ill. 61109. Since the sensor 500 of the current embodiment has a connector 506, it can be used to monitor entry points which are subject to relatively frequent and legitimate openings. For instance, sensors 500 with connectors could be used on fuel caps 210. Note that in scenarios involving such entry points, the anti-theft system 300 could still be configured to raise an alarm when the connector 506 is disconnected (and the corresponding conductive path opens). But, the remote alert center 306 could be configured to, upon an alert, query the geo-positioning unit 332 for the location of the vehicle. If the vehicle happens to be located at a fueling depot, gas, station, etc. that location can be noted and considered in how the alert is handled.

Figure 6:
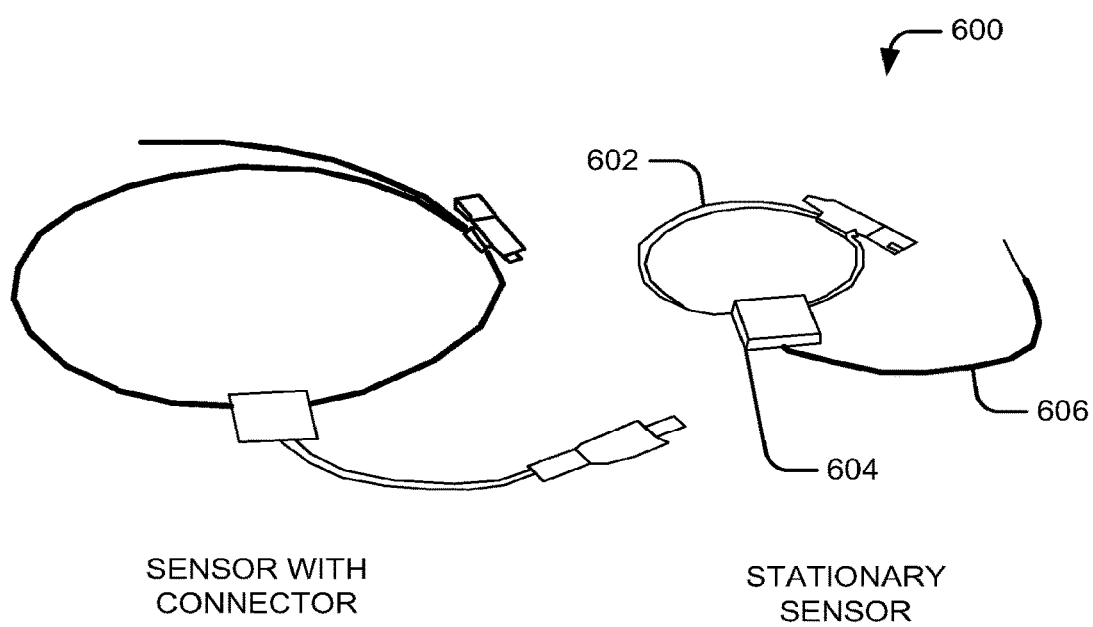
FIG. 6 illustrates a stationary fuel anti-theft sensor.

FIG. 6 illustrates a stationary fuel anti-theft sensor. The sensor 600 of the current embodiment includes a clamp 602, a sensor package 604, and a lead 606 (or leads). The leads 606 are configured to be permanently, mechanically coupled (and in permanent electrical communication) with a sensor network 310. In some cases, that coupling can be via soldering, brazing, etc. Thus, the sensor 600 of the current embodiment can be used to monitor entry points which, ordinarily, would experience only occasional openings. In other words, they are stationary. For instance, most couplings 222 and/or other components (exempting the fuel cap 210 for most vehicles) would be opened only if the vehicle is undergoing maintenance. Again, by querying the geo-positioning unit 334, checking maintenance orders/records, etc. the remote alert center 306 can determined whether the vehicle is located at an appropriate maintenance depot. The information so gained can be used in evaluating alerts arising from the sensor 600 of the current embodiment.

Figure 7:
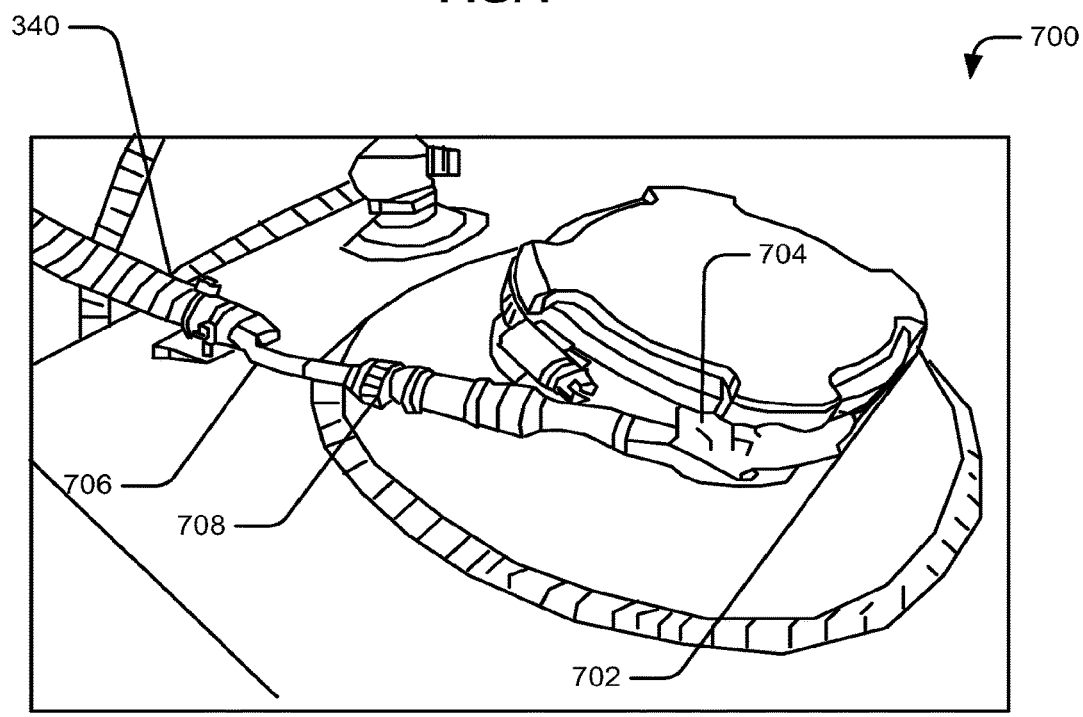
FIG. 7 illustrates a fuel anti-theft sensor installed on a fuel cap.

FIG. 7 illustrates a fuel anti-theft sensor installed on a fuel cap. The sensor 700 of the current embodiment comprises a clamp 702, a sensor package 704, a lead 706, and a grounding strap 708. The grounding strap 708 can be used to ground the sensor 700 to the vehicle chassis. Doing so ensures that the sensor 700 has a ground return path to the sensor network 310 despite the possibility that non-conductive material might interpose themselves between the sensor 700 and the chassis ground. For instance, OEMs (and after market manufacturers) often make fuel caps 210 from plastic and/or other non-conductive materials. Moreover, even should such fuel system 200 components be made of conductive materials, grease, dirt, grime, etc. might exist on one or more components rendering them non conductive. Moreover, some components might be coated in paint, wax, primer, etc. rendering such components non conductive. Of course, the underlying components could be clamped, stripped, etc. to increase their conductance in appropriate circumstances. Note that the grounding strap 708 could comprise a copper wire, piece of aluminum foil, etc. without departing from the current disclosure.

Figure 8:
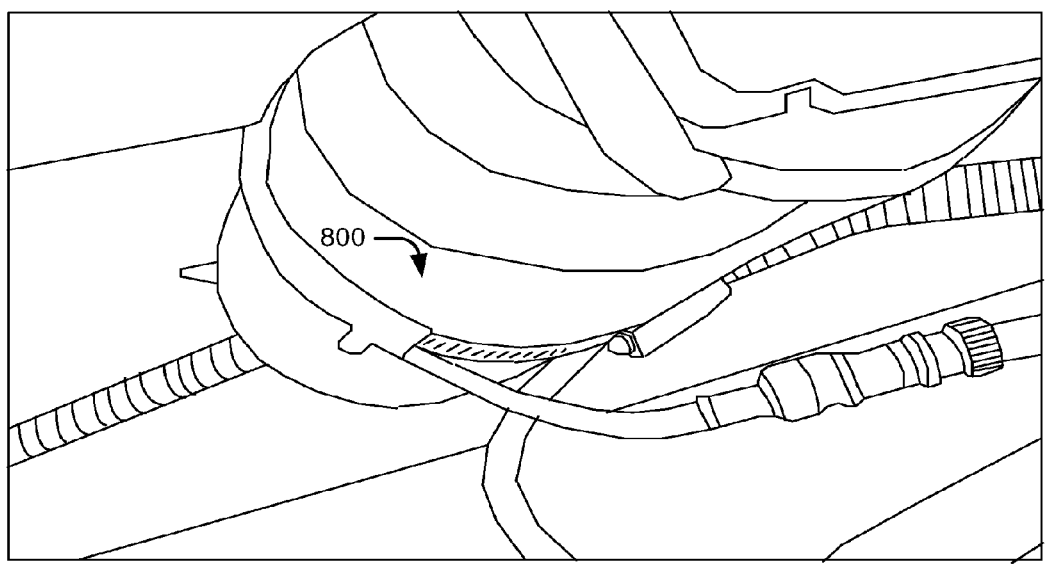
FIG. 8 illustrates a fuel anti-theft sensor installed on a fuel filter.
Figure 9:
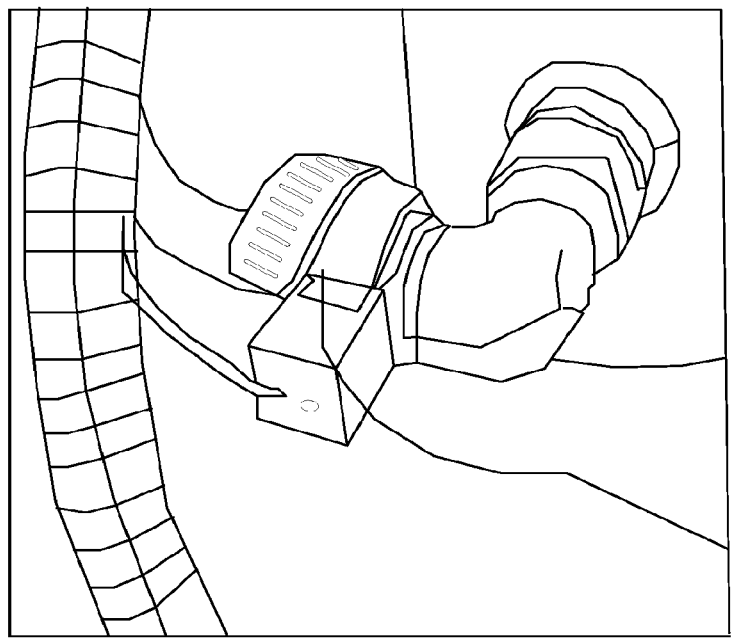
FIG. 9 illustrates a fuel anti-theft sensor installed on a fuel suction line.
Figure 10:
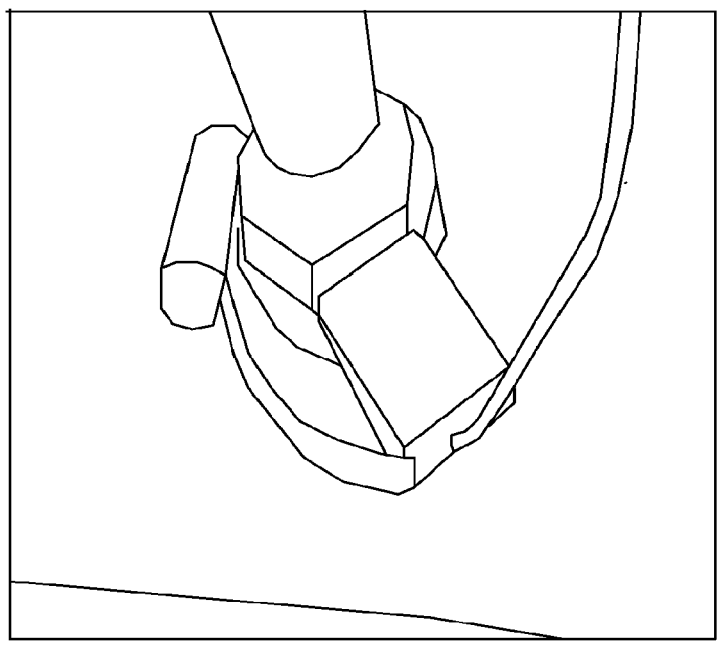
FIG. 10 illustrates a fuel anti-theft sensor installed on a fuel return line.

FIG. 8 illustrates a fuel anti-theft sensor installed on a fuel filter. Meanwhile, FIG. 9 illustrates a fuel anti-theft sensor installed on a fuel suction line and FIG. 10 illustrates a fuel anti-theft sensor installed on a fuel return line. Thus, FIGS. 8-10 illustrate that sensors 800, 900, and 1000 of embodiments can be installed at many locations throughout fuel systems 200 for many different types of vehicles.

Figure 11:
FIG. 11 illustrates a graphical user interface (GUI) of a fuel anti-theft system.

FIG. 11 illustrates a graphical user interface (GUI) of a fuel anti-theft system. More particularly, FIG. 11 shows the GUI 1100, and a map 1102, a route 1104, a destination 1105, a detour 1106, calendaring controls 1108, map controls 1110, route markers 1112, route cautions 1114, route warnings 1116, a home tab 1118, a maps tab 1120, reports tab 1122, and an administrative tab 1124. The GUI 1100 and underlying software application, program, etc. can be hosted by remote alert centers 306, servers, computers, mobile devices (for instance, cellular telephones, laptops, tablets, notebooks, etc.) among others. The GUI 1100 of the current embodiment allows users to monitor, explore, investigate, etc. activities which might be related to vehicular fuel theft.

More specifically, the GUI 1100 illustrated in FIG. 11 displays a map 1102 on which the route 1104 of a user-selected vehicle is displayed. That route 1104 includes one or more intended destinations 1105 such as a local shop, business, factory, etc. and, as displayed, a detour 1106. Moreover, the actual route 1104 (including the detour 1106) can be rendered based on geo-positioning data provided by the geo-positioning circuit 334 and/or queried therefrom. Note also that scheduled delivery routes could be displayed on the GUI 1100. Of course, the detour 1106 might be legitimate such as where the driver acted to avoid congestion, construction, flooding, etc. On the other hand, that detour 1106 could indicate a location at which the driver has tampered-with, is tampering with, and/or is about to tamper with the fuel system 200.

FIG. 11 also shows that the GUI 1100 can display various route markers 1112, route cautions 1114, and/or route warnings 1116. The route markers 1112 can be displayed corresponding to the locations at which the vehicle is proceeding at (or above) a user selected speed such as the local speed limit. In contrast, the route cautions 1114 can be displayed for locations at which the vehicle has slowed to below a user selected speed. Such behavior might be indicative of traffic/road related difficulties and/or imminent fuel system tampering. The GUI 1100 also shows several route warnings 1116 which correspond to locations at which the vehicle has slowed below some user-selected speed and/or stopped. Such behavior could be indicative of imminent or ongoing fuel system tampering and/or fuel theft. Note that the vehicle speeds, location, etc. can be obtained remotely by querying the fuel anti-theft system 300 of embodiments and/or other onboard systems. Thus, users such as owners can examine the map 1102 to determine where/when fuel theft might be occurring and/or patterns related thereto.

Of course, the GUI 1100 has other features as well. For instance, the calendaring controls 1108 allow a user to see the current date/time. In some embodiments, the calendaring controls 1108 allow users to select dates/times for which the GUI 1100 can display corresponding maps 1102, routes 1104, route markers 1112, route cautions 114, route warnings 1116, etc. Moreover, the GUI 1100 can include map controls 1110 for zooming into/out of maps 1102, navigating on maps 1102, saving maps 1102, printing maps 1102, etc.

GUIs 1100 of embodiments also include controls such as the home tab 1118, the maps tab 1120, the reports tab 1122, the administrative tab 1124, etc. These tabs 1118, 1120, 1122, and/or 1124 allow users to navigate between various and corresponding portions of the GUI 1100. For instance, the maps tab 1120 can allow users to navigate between various maps 1102 whereas the reports tab 1122 can provide corresponding functionality for various reports. The administrative tab 1124 can allow users to handle certain administrative activities such as user profile maintenance, vehicle profile maintenance, driver profile maintenance, etc. The home tab 1118 can provide overall GUI navigation controls such as those related to logging in, logging in, logging out, switching users, etc.

Figure 12:
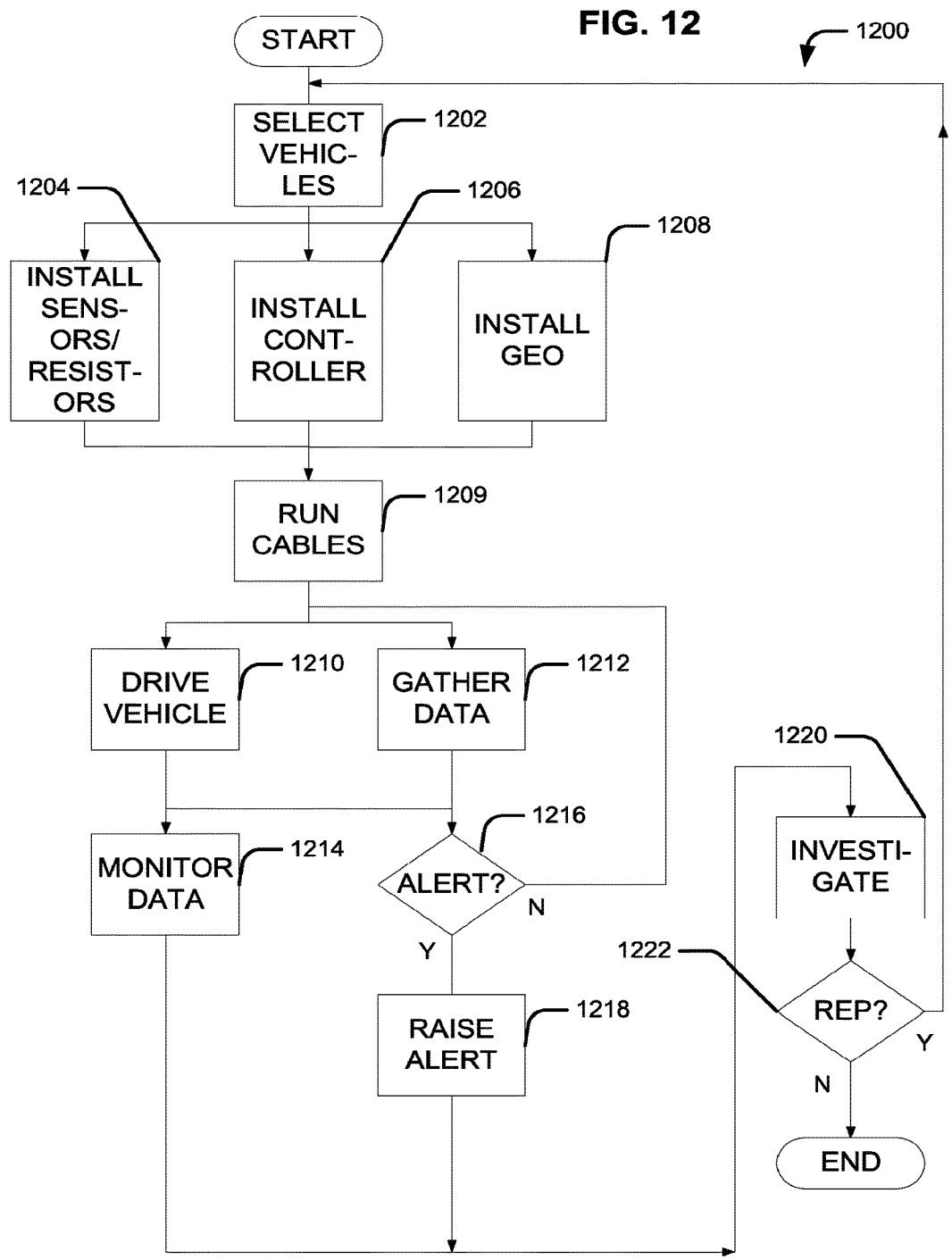
FIG. 12 illustrates a flowchart of a method of sensing fuel theft.

FIG. 12 illustrates a flowchart of a method of sensing fuel theft. The method 1200 comprises various activities such as selecting one or more vehicles on which to install anti-theft systems 300. These vehicles might be those involved in fuel theft and/or other suspicious activities, a group of vehicles which for some reason might be particularly susceptible to such activities, the vehicles driven by certain users, etc. See reference 1202.

Method 1200 can also comprise installing the various sensors on one or more of the selected vehicles. Thus, sensors can be clamped on to the fuel cap 210, the fuel intake 211, the fuel tank 202, the fuel pump(s) 204 and/or 212, the fuel filter 206, the fuel pressure regulator 218, various fuel lines such as the fuel return line 220, and/or various couplings 222 in the fuel systems 200 of those vehicles. If the number of installed sensors 318 does not equal the pre-selected number of sensors 318 for a given controller 330, then the anti-theft system 300 can be configured accordingly. For instance, if the anti-theft system 300 has too many sensors 318 for the selected controller 330, then an appropriate number of controllers 330 can be added to the anti-theft system 300. If, though or in addition, too few sensors 318 have been installed for the pre-selected number (s) of sensors associated with the number of controllers 330 in the anti-theft system 300, then various resistors 324 can be connected across one or more of the controller 330 inputs. Thus, the controllers 330 can be connected to sensor networks 310 having overall resistances/conductances corresponding to the pre-selected number(s) of sensors 318. See reference 1204.

Of course, if the controller(s) 330 have not already been installed, then they can be installed on the vehicle. For instance, the controller 330 can be mounted into the dashboard or otherwise installed at some relatively inaccessible location on the vehicle as indicated at reference 1206. If a separate geo-positioning unit is to be included in the anti-theft system 300, then it can be installed in/on the vehicle and/or connected to the controller. See reference 1208. Moreover, the various conduits 240 can be run through the vehicle from the location(s) of the sensor(s) 318 to the controller 330. The wires, cables 224, 226, and 228, grounding straps, etc. associated with the sensors can then be run through the conduits 240 and/or run separately therefrom. If desired, the conduits, cables, sensors, etc. can be disguised to appear as if they have been located on the vehicle for all or a portion of the life of the vehicle. For instance, dirt, grease, grime, etc. can be applied to them. See reference 1209.

Reference 1210 of FIG. 12 illustrates that the vehicle may be driven at some point. For instance, a particular driver(s) might be alerted to the presence of the anti-theft system 300 whereas some other drivers might be allowed to remain unaware of its presence. One way or another, as the vehicles are driven, the data generated by the anti-theft system 300 (and/or other onboard systems) can be gathered and/or monitored as indicated at references 1212 and 1214. If the data indicates that a tampering event might be underway then the appropriate route cautions/warnings can be raised/transmitted to the remote alert center. If the data suggests that tampering might not be occurring then the data monitoring can continue. See reference 1216 and 1218.

With continuing reference to FIG. 12, in scenarios involving potential tampering (and/or otherwise), users such as vehicle owners can investigate activities associated with the vehicle. See reference 1220. Of course, they can take appropriate actions such as placing various drivers, vehicles, etc. under surveillance. Method 1200 can repeat in whole or in part as indicated at reference 1222.

Figure 13:
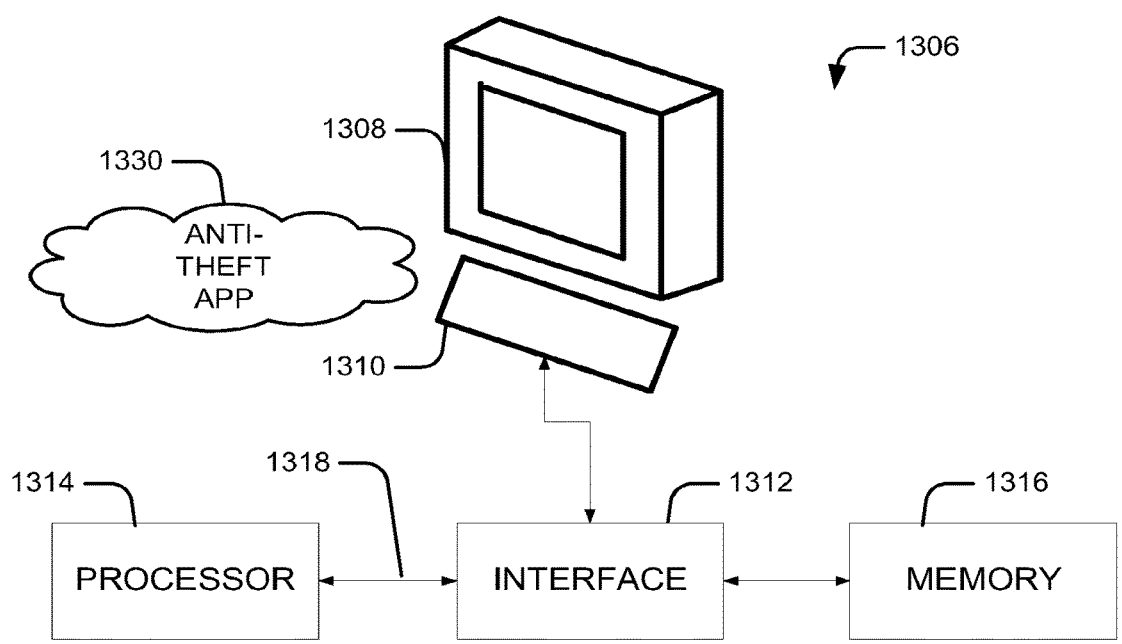
FIG. 13 illustrates a computer for use in fuel anti-theft systems.

FIG. 13 illustrates a computer for use in fuel anti-theft systems. Indeed, the computer 1306 could host an application 1330 for presenting the GUI 1100 (and processing the associated data) at the remote alert center. In some cases, the controller 330 could include some or all of the components of the computer 1306 although the controller 330 could be implemented in analog hardware, firmware, ASICs (application specific integrated circuits), RISC (reduced instruction set integrated circuits), etc.

At this juncture a few words might be in order about the computer(s) 1306 and/or other systems, apparatus, etc. used to design, store, host, recall, display, transmit, receive, etc. programs, applications, controllers, algorithms, routines, codes, GUIs, etc. of fuel anti-theft systems of embodiments. The type of computer 1306 used for such purposes does not limit the scope of the disclosure but certainly includes those now known as well as those which will arise in the future. But usually, these computers 1306 will include some type of display 1308, keyboard 1310, interface 1312, processor 1314, memory 1316, and bus 1318.

Indeed, any type of human-machine interface (as illustrated by display 1308 and keyboard 1310) will do so long as it allows some or all of the human interactions with the computer 1306 as disclosed elsewhere herein. Similarly, the interface 1312 can be a network interface card (NIC), a WiFi transceiver, an Ethernet interface, etc. allowing various components of computer 1306 to communicate with each other and/or other devices. The computer 1306, though, could be a stand-alone device without departing from the scope of the current disclosure.

Moreover, while FIG. 13 illustrates that the computer 1306 includes a processor 1314, the computer 1306 might include some other type of device for performing methods disclosed herein. For instance, the computer 1306 could include a microprocessor, an ASIC (Application Specific Integrated Circuit), a RISC (Reduced Instruction Set IC), a neural network, etc. instead of, or in addition, to the processor 1314. Thus, the device used to perform the methods disclosed herein is not limiting.

Again with reference to FIG. 13, the memory 1316 can be any type of memory currently available or that might arise in the future. For instance, the memory 1316 could be a hard drive, a ROM (Read Only Memory), a RAM (Random Access Memory), flash memory, a CD (Compact Disc), etc. or a combination thereof. No matter its form, in the current embodiment, the memory 1316 stores instructions which enable the processor 1314 (or other device) to perform at least some of the methods disclosed herein as well as (perhaps) others. The memory 1316 of the current embodiment also stores data pertaining to such methods, user inputs thereto, outputs thereof, etc. At least some of the various components of the computer 1306 can communicate over any type of bus 1318 enabling their operations in some or all of the methods disclosed herein. Such buses include, without limitation, SCSI (Small Computer System Interface), ISA (Industry Standard Architecture), EISA (Extended Industry Standard Architecture), etc., buses or a combination thereof. With that having been said, it might be useful to now consider some aspects of the disclosed subject matter.

Figure 14:
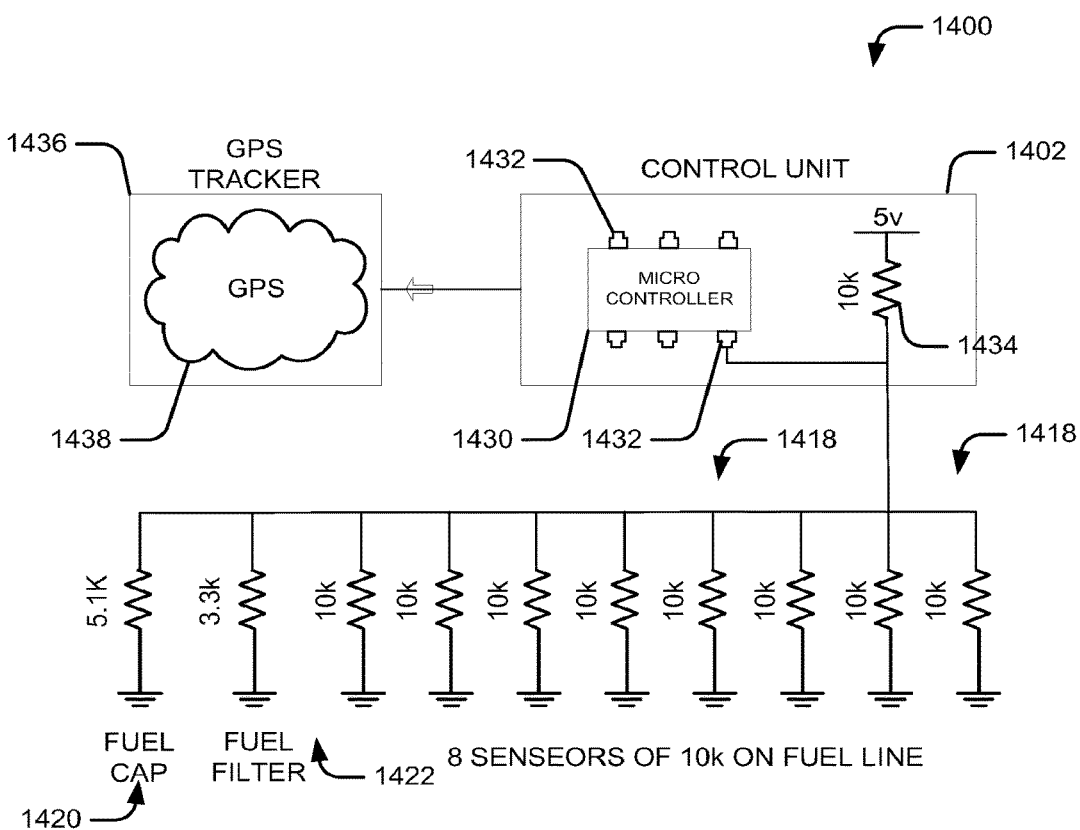
FIG. 14 schematically illustrates a fuel anti-theft system.

FIG. 14 schematically illustrates a fuel anti-theft system. More specifically, FIG. 14 illustrates a fuel anti-theft system 1400, a control unit 1402, line sensors 1418, an identifiable sensor 1420, an identifiable sensor 1422, a microcontroller 1430, jacks 1432, a pull-up resistor 1434, a GPS Tracker 1436, and a GPS application 1438. The fuel anti-theft system 1400 of the current embodiment can be used where certain routine activities might appear to be theft-events thereby triggering false alarms. For instance, fuel caps and fuel filters are more routinely opened/replaced than other components in typical fuel systems.

Activations of the fuel cap and fuel filter identifiable sensors 1420 and 1422 are typically more routine than activation of other sensors such as the line sensors 1418. Thus, users might want to respond to activation of the identifiable sensors 1420 and/or 1422 differently than activation of the line sensors 1418 (and/or even each other).

The fuel anti-theft system 1400 shown in FIG. 14 produces different, identifiable resistance changes as sensed at the input to the control unit 1802. The resistor values used for the fuel cap identifiable sensor 1420 (5.1 kohm) and the fuel filter identifiable sensor 1422 (3.3 kohm) are different from each other and the line sensors 1418 (10 kohm) in the fuel anti-theft system 1400. The control unit 1402 of the current embodiment will detect a unique resistance change value for each sensor type and take appropriate action to notify users of the activation.

Note that these differing resistance changes can be determined with reference to the following equations and/or Table 2. Note also that while the foregoing resistance values were selected to be different enough to produce readily discernible network resistance changes, other resistance values could be used.

$$1/R_{secure} = 1/R_{fuelcap} + 1/R_{fuelfilter} + n*1/R_{fuellinesensor}$$

Where:

$R_{secure}$ is the expected, overall resistance of the sensor network, $R_{fuelfilter}$ is fuel filter sensor resistance (3.3 Kohm)

$R_{fuelcap}$ is fuel cap sensor resistance (5.1 Kohm)

$R_{fuellinesensor}$ is fuel line sensor resistance (10 Kohm)

n is the pre-selected number (usually 8 sensors)

TABLE 1

| Disconnected Sensors(s) | Network resistance (k-ohm) |
| --- | --- |
| None | 0.77 |
| Fuel Cap | 0.9 |
| Fuel Filter | 1.004 |
| 1 Fuel Line | 0.83 |
| 2 Fuel Line | 0.91 |
| 3 Fuel Line | 1 |
| 4 Fuel Line | 1.11 |
| 5 Fuel Line | 1.25 |
| 6 Fuel Line | 1.43 |
| 7 Fuel Line | 1.67 |
| 8 Fuel Line | 2 |

FIG. 14 also illustrates that the microcontroller 1430 (and/or control unit 1802) could include jacks 1432 for convenient connection/disconnection of the various wires, cables, etc. in the system to these devices. In the alternative, or in addition, one or more of these cables could be hardwire to the control unit 1402 and/or microcontroller 1430.

Further still, FIG. 14 also illustrates that the control unit 1402 can pass a signal to the GPS tracker 1436/GPS application 1438 indicative of whether the fuel system appears to be secure, potentially tampered with, or in some routine condition. The GPS application 1438 can be configured to record the location of the fuel system (or vehicle) when that signal changes and/or can send a corresponding message to various users upon such changes. If desired, the GPS application 1438 can be configured to send a more or less continuous signal so that the sensed state of the system is known at all times. Furthermore, the GPS application can be configured with a user interface (such as, a graphical user interface) which allows users to create their own rules for responding to alerts. For instance, a user could configure the GPS application to automatically disable the ignition circuit of the vehicle if an alert indicates that fuel theft might be occurring (or has occurred).

Figure 15:
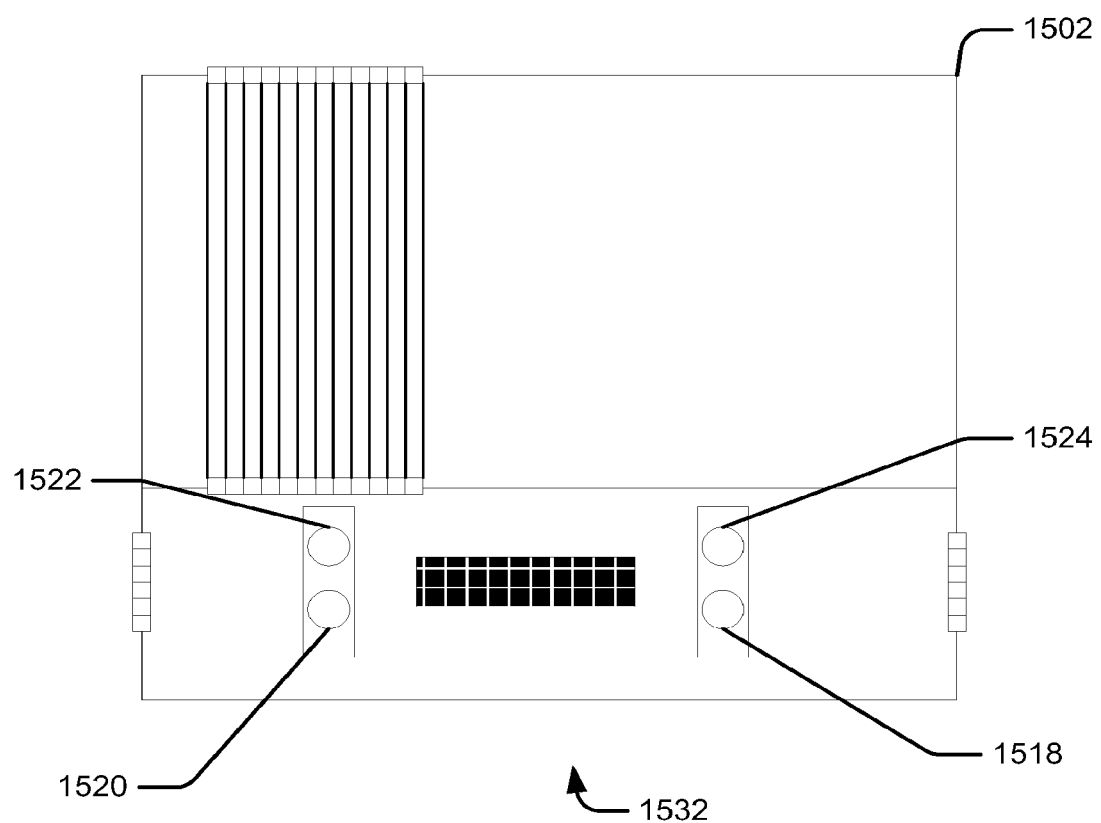
FIG. 15 illustrates a fuel anti-theft control unit.

FIG. 15 illustrates a fuel anti-theft control unit. The fuel anti-theft control unit 1502 of the current embodiment includes a series of jacks 1532 for connecting the sensors of the network to it. It also includes several indicators 1518, 1520, and 1522 corresponding to the line sensors 1518 and identifiable sensors 1520 and 1522. The control unit 1502 can also include an indicator 1524 configured to be activated should more than one sensor be activated.

Figure 16:
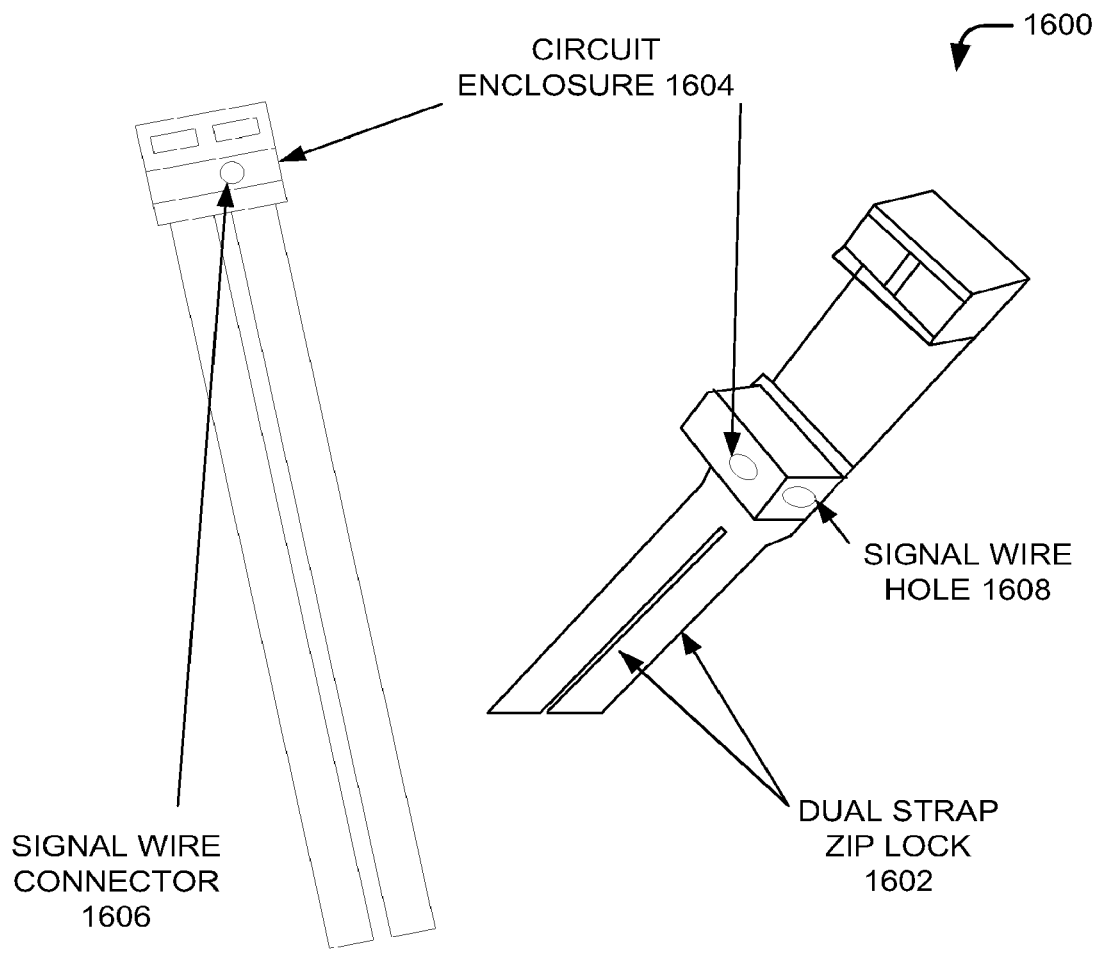
FIGS. 16 and 17 illustrate a fuel line sensor.
Figure 17:
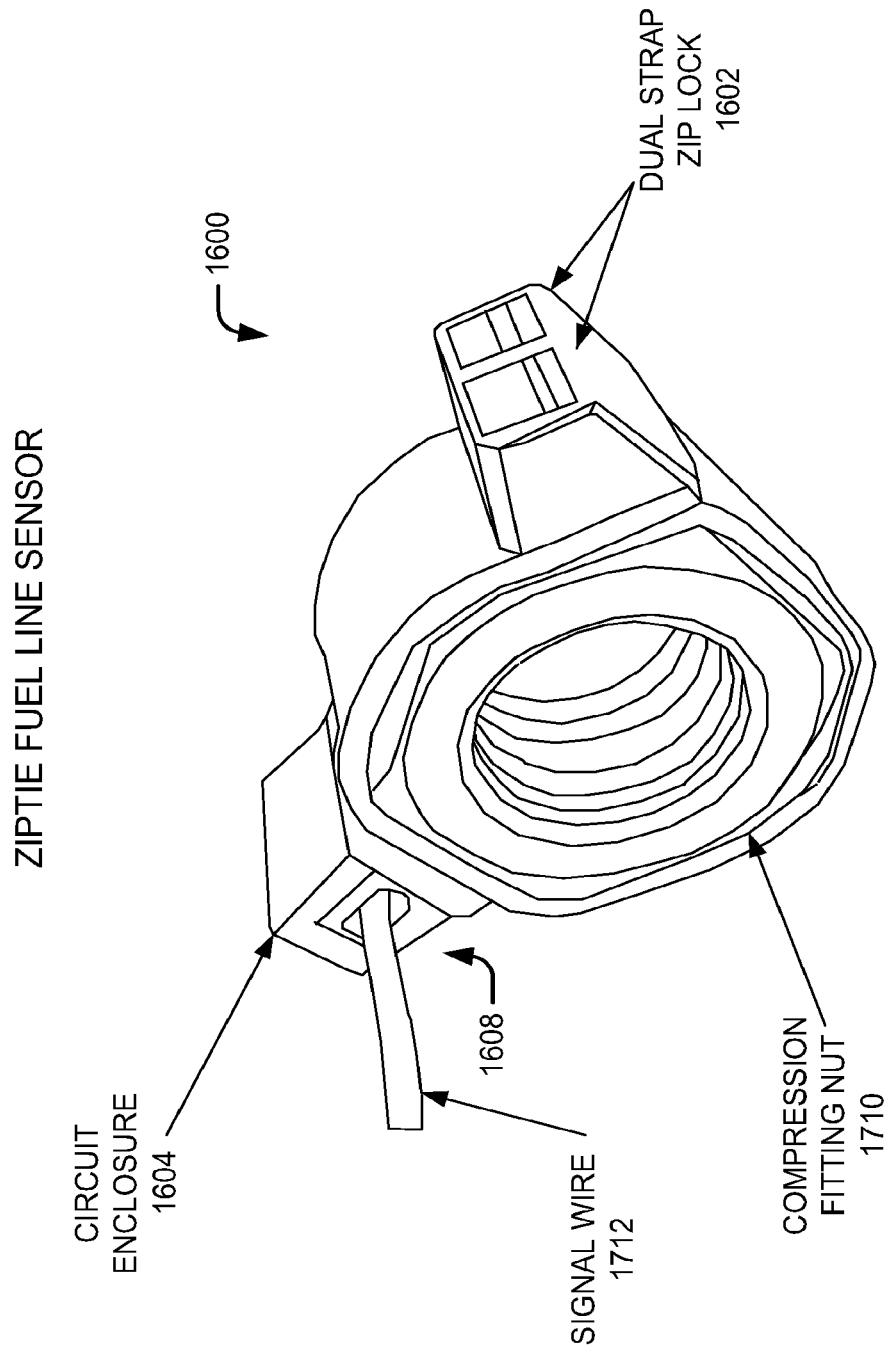

FIGS. 16 and 17 illustrate a fuel line sensor. The fuel line sensor 1600 of the current embodiment can be installed around compression fittings (or other components) on vehicle fuel lines. In the event that the fuel line sensor 1600 is uninstalled to allow access to the fitting (or otherwise tampered with), the internal electrical connection to the vehicle ground will be broken (or destroyed), and the microcontroller of the current embodiment will detect the change of state and will send an alert.

Furthermore, FIG. 16 illustrates that the fuel line sensor 1600 can be secured to various components via a dual strap cable tie 1602 (or cable ties, zip ties, zip locks, etc.). FIG. 16 also shows that the fuel line sensor 1600 also includes a circuit enclosure 1604 and a signal wire connector 1606 and defines a signal wire hole 1608.

While FIG. 16 illustrates the fuel line sensor 1600 in an uninstalled condition, FIG. 17 illustrates it as being installed on a compression fitting nut 1710 and with a signal wire 1712 connected thereto via the signal wire hole 1608/signal wire connector 1606. Note that the dual strap cable tie 1602 has been pulled snug against the compression fitting nut 1710.

Figure 18:
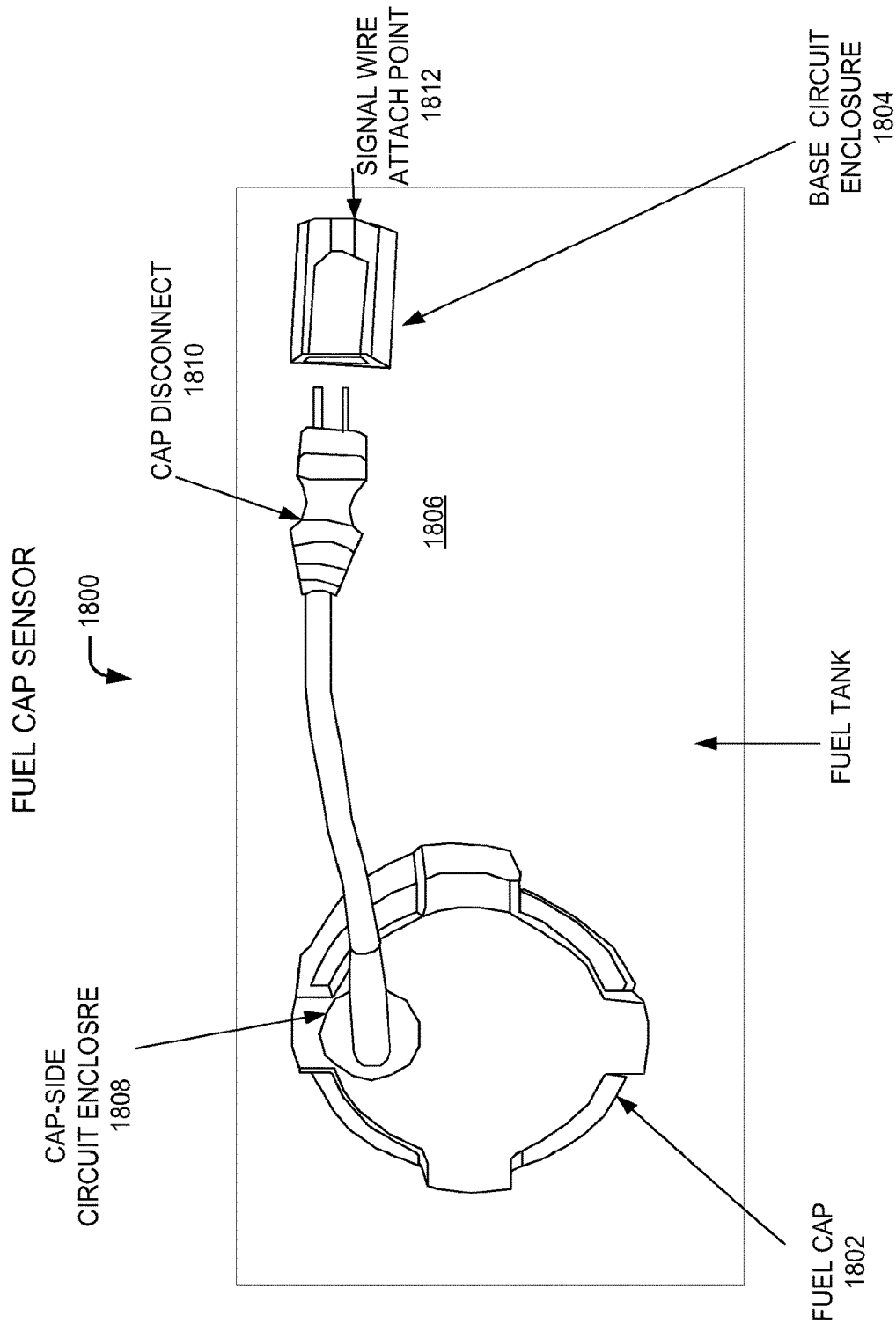
FIG. 18 illustrates a fuel cap sensor.

FIG. 18 illustrates a fuel cap sensor. The fuel cap (identifiable) sensor 1800 of the current embodiment can be installed on various fuel caps. The fuel cap sensor 1800 can be secured to the fuel cap 1802 via an adhesive while the circuit enclosure 1804 can be secured to the fuel tank 1806 by an adhesive too. In the event that the fuel cap sensor 1800 is unplugged to allow access to the fuel tank 1806, the circuit for that sensor is broken and an alert is sent. When the fuel cap sensor 1800 is uninstalled (or removed by force or otherwise tampered with) it destroys its electrical connection to the vehicle ground. The microcontroller of the current embodiment detects the change of state and an alert is sent.

Note that FIG. 18 also illustrates a cap-side circuit enclosure 1808 and the two halves of a quick disconnect 1810 of the fuel cap sensor 1800. Further, the tank-side or base circuit enclosure 1804 defines or includes a signal wire attachment point 1812.

In some embodiments fuel/cargo anti-theft systems include digital sensors which transmit their unique IDs or codes wirelessly to appropriately configured controllers. If the sensor detects that it has been tampered with, removed from the system, etc., it stops transmitting its ID. Of course, the controller of the current embodiment periodically checks for the presence of recent/contemporaneous transmissions of the IDs associated with its sensors. Should one or more appear to be missing such controllers could then raise an alarm (for instance, turn on a light, buzzer, speaker, klaxon, etc.), alert, send a text message to the control center, send an email to a particular person, mobile or computing device, cellular phone, etc. The controllers could also, or in the alternative, record the location, time, and (if instrumented appropriately), record conditions in/near the vehicle including temperature, atmospheric pressure, humidity, etc.

Furthermore, some embodiments provide fuel/cargo anti-theft systems which are configured to consume little power. These systems, therefore, can operate on various vehicles for extended periods of time. Systems of the current embodiment can be configured to operate on low voltages and/or with limited current flow such that they meet intrinsically safe requirements for various hazardous locations as defined by such documents as the National Electric Code of the United States. In some embodiments, anti-theft systems are provided in a software as a service (SaaS) form on a web server and/or database server. Thus, in some embodiments, no application need exist on the vehicle and/or in the field.

Controllers of various embodiments condition the signal(s) which they sense from the various sensors in communication therewith. For instance, it might be desirable to filter the signal so that noise on the circuit will not appear to be a potential case of tampering. For instance, a 6 second, time-series filter can be applied to the signal before controllers of the current embodiment sense/respond to the signal. In this manner, false alarms can be reduced if not eliminated. But other more/less complex signal conditioning can be applied to the signal without departing from the scope of the current disclosure.

Embodiments provide fuel anti-theft systems, sensors, controllers, etc. which allow for the monitoring of vehicle fuel systems for potential tampering and/or fuel theft. Some such systems allow for discreet, unobtrusive, and potentially unsuspected fuel system monitoring. In some embodiments, the sensors, controllers, systems, etc. are reliable, rugged, and relatively inexpensive to install and/or operate. Systems of some embodiments allow users to investigate potential fuel-theft events remotely and to implement corrective actions. Now with reference to FIGS. 19 to 25, it might be helpful to disclose aspects of cargo anti-theft protection systems.

FIG. 19 illustrates a cargo anti-theft system. Generally, FIG. 19 shows the cargo anti-theft system installed on a cargo vehicle. It allows an owner or other interested user to monitor the status of cargo on vehicles even in remote locations. And should some apparent tampering occur, the system alerts that user of the potential that someone might be attempting to steal cargo or otherwise tamper with it. More specifically, FIG. 19 illustrates a system 1900, a vehicle 1902, a cargo compartment 1904, a cab 1906, an access point 1908, a controller 1910, a geo-positioning circuit 1912, at least one lock 1914, a cargo switch 1916, and its switch halves 1918 and 1920.

As to the vehicle 1902, the particular vehicle 1902 illustrated by FIG. 19 happens to be a fuel truck. However, it could be a trailer, a semi-trailer, a "cube" truck, a delivery van, a ship, a boat, an airplane, etc. However, it does include or define a cargo compartment 1904 which often holds cargo and frequently confines the cargo therein. Indeed, the cargo compartment 1904 (or the structure(s) defining it) often shield the cargo from the elements, damage during shipment, tampering, theft, and the like. For instance, in many trucks, vans, etc. the cargo compartment 1904 lies within a series of walls/panels of the vehicle 1902 such as floors, roofs/ceilings, hulls, fuselages, bulkheads, etc.

Moreover, the vehicle 1902 often comprises two or more distinct parts such as a trailer (which might define the cargo compartment) and a cab, tractor, bridge, cockpit, etc. In many scenarios, the cab hosts a user who drives, operates, navigates, controls, etc. the vehicle 1902. That user also frequently has duties pertaining to loading cargo onto the vehicle 1902 (and/or unloading it). Thus, while not always the case, the user has access to the entire vehicle 1902 including the cargo compartment 1904, the cab 1906, and/or the cargo itself. Of course, third parties might also attempt to gain access to the cargo compartment 1904, the cargo therein, and/or the cab 1906 for perhaps nefarious and/or malicious purposes. And, in part, the cargo compartment 1904 is often protected with locks on its various access points 1908 to prevent or at least hinder such unauthorized access.

As further disclosed elsewhere herein, the cab 1906 usually contains controls and/or instruments to aid the user in operating the vehicle. And it can contain various components of the system 1900 such as the controller 1910 and/or geo-positioning circuit 1912. Of course, one or more of these components can be mounted on the roof of the cab 1906 and/or the cargo compartment 1904 to, for instance, provide its antenna (if it has one) access to electromagnetic signals that might otherwise be shielded by the structure of the vehicle 1902. Of course the cab 1906 can be protected from unauthorized access by locks and the like as well to protect these components and other objects in the cab 1906. Note that components mounted outside of the cargo compartment 1904 and cab 1906 can be somewhat hidden by being camouflaged or placed in inconspicuous locations. For instance, many vehicles 1902 are tall enough that a component mounted on top of the vehicle 1902 might not be noticed by the user and/or third parties who might be unaware of the presence of the system 1900.

The access point 1908 takes on various configurations and the one shown in FIG. 19 happens to be a valve box for a fuel truck. This valve box contains valves which are in communication with the fuel in the truck (i.e., the cargo) and load/unload ports, couplings, etc. In other instances, the access point 1908 could be a door, hatch, manway, etc. And, of course, the access point 1908 will usually reflect the nature of the cargo and/or the vehicle 1902 whether the cargo is solid, liquid, gaseous, packages, granular, bulk material, money, etc.

With continuing reference to FIG. 19, the controller 1910 performs certain functions and/or communicates with various other components of the system 1900 to do so. For instance, the controller 1910 can sense the position, state, and/or condition of the cargo switch 1916 and from that information infer whether or not an attempt to access the cargo compartment 1904 might be underway. It can also send a signal indicative of the position of the cargo switch 1916 to the geo-positioning circuit 1912. Moreover, it can store a PIN (Personal Identification Number) associated with the openings and/or closings of the cargo switch 1904 and determine whether the cargo switch 1916 has been opened/closed in a pattern corresponding to that PIN. If it has, then the controller 1910 can send a signal to the geo-positioning circuit 1912 that an authorized entry (or access) to the cargo compartment 1904 is underway. If the pattern fails to match the PIN, then the controller 1910 can signal the geo-positioning circuit 1912 accordingly. For instance, should the PIN be 3124, a user would open and close the cargo switch 3 times taking a pre-selected amount of time between opening/closing the switch, pause for another pre-selected (and perhaps longer) time, open/close the switch once, wait, open/close the switch twice, wait, and open/close the switch 4 more times to enter that PIN. In some embodiments, the controller 1910 stores (or retrieves from a remote control center over the Internet or other telecommunications system) a list of PINs and, each time one is used, it deletes the used PIN. It then loads another PIN from the list to be the next active/correct PIN. In this way, users can signal the system 1900 that they have authority to access the cargo compartment 1904 once (or a pre-determined number of times) without triggering an alarm (but perhaps causing the transmission of an authorized access signal).

In the alternative, or in addition, PINs can be time-based. In other words, each digit of the pin can indicate how long the user should hold the cargo switch 1916 in the open/mated and closed/de-mated positions. For instance, suppose the PIN is 315. To signal the controller that an authorized cargo access is imminent, the user would open the switch, then close it for 3 seconds. The user would then close the switch for a (1) second and close it for 5 seconds. Upon the end of the 5 second period the user would open the switch and access the cargo without setting off an alarm. Although the controller 1910 could log the event and send a signal indicative thereof.

The controller 1910 can also control the lock(s) 1914 via encoded communications if desired. Indeed, if an authorized entry appears to be under way (as sensed via the PIN for instance) the controller 1910 can send a signal to the lock 1914 to open. The lock is typically installed inside the cargo bay making it inaccessible from outside and therefore making tampering with it difficult. Of course, the controller can also lock the lock 1914 in other scenarios. For instance, the default, loss-of-power, and/or fail-safe state of the signal and/or the lock could be in the locked state. In some embodiments, the controller 1910 could also receive an override signal to unlock the lock from a remote control center (and perhaps over a telecommunications system). Furthermore, the controller 1910 of embodiments can receive from the geo-positioning circuit 1912 a signal indicating whether the system 1900 is in a geozone wherein entry can be deemed either authorized or unauthorized. Thus, the system 1900 can establish, maintain, sense, etc. whether the vehicle 1902 is in a location where access to the cargo compartment 1904 is authorized. Those locations can correspond to expected/scheduled destinations for the vehicle and/or cargo. Again, if access is attempted in a location other than an authorized geolocation then the controller 1910 can raise an alarm. In this manner, and/or others, the system 1900 can create "geofences" around legitimate access areas.

Of course, it might happen that a legitimate but unauthorized attempt might be made to access the cargo compartment 1904. For instance, the vehicle 1902 might be stopped by law enforcement such as the highway patrol, police, an immigration service, an alcoholic beverage control agency, a firearms agency, a customs officer, etc. In which case, the operator might be ordered to open the cargo compartment 1904 for inspection and/or search. In such cases the operator can obtain a PIN from the control center (or have one memorized or otherwise available) and obtain authorization in that or a similar manner. Likewise, unscheduled maintenance might cause the operator to legitimately need access to the cargo compartment and the PIN can allow for that. And, of course, many other situations might arise where such access is legitimately needed. In such cases the controller 1910 can still report that access occurred for subsequent follow up by interested users.

In addition, the controller 1910 can be in communication with a battery to receive and/or distribute power to the system 1900. That battery, moreover, could be an internal battery. Of course, the controller 1910 could receive power from the vehicle 1902, a solar panel 1930 (whether on the controller or external), a battery, or some other power source. However, that might not always be the case. For instance, when the controller is located in the cargo compartment 1904, vehicle power might not be available because the cab 1906 is no longer present. Or vehicle power could fail. Thus, it might be the case that the controller 1910 loses power and is consequently unpowered. In such instances, the geo-positioning circuit 1912 can detect the loss of the controller 1910 via the lack of signals coming from the controller and report that the controller is no longer powered and/or present. It can also report the location at which it currently resides to the control center. Thus, follow up activities can determine whether a mere power failure occurred, whether the controller was tampered with, destroyed, disabled, removed, etc. Moreover, in such situations, it will be known where the geo-positioning circuit 1912 (and presumably the vehicle 1902) was at the time of the incident and perhaps afterward as well.

Note also that the controller 1910 can communicate with the control center directly over its own telecommunications link (for instance, a cellular telephony link). It can also, or instead, be configured to communicate therewith via the geo-positioning circuit 1912. And, in some embodiments, it can be configured to do both. Moreover, while some embodiments provide for hard wired communications/connections with the various other components of the system 1900, that need not be the case. For instance, the entire system 1900 or select components thereof could communicate with each other via WiFi, infrared, RFID, Bluetooth, Zigbee®, etc. technology.

With ongoing reference to FIG. 19, the system 1900 happens to be shown installed as individual components. However, some are all of them can be combined into an integrated box or component. For instance the controller 1910 (with or without battery) and the geo-positioning circuit 1912 can be mounted inside a rugged electronics enclosure to prevent/hinder users from tampering with the same. That enclosure can be mounted and/or mechanically coupled to the vehicle 1902 inside an access-controlled volume such as the cargo compartment 1904 or cab 1906 for further, or alternate protection from tampering, damage, and/or the like. Indeed, it can be installed in the volume it is to monitor. The mounting can also be by way of special fasteners, welding, riveting, etc. so that attempts to open the enclosure would be readily apparent upon inspection or otherwise.

FIG. 20 illustrates another cargo anti-theft system. This system 2000 happens to be installed on a trailer. FIG. 20 also illustrates various components of the system 2000 including a cargo compartment 2004, an access point 2008, a controller 2010, a geo-positioning circuit 2012, a lock 2014, a switch halve 2018, and a camera 2022. Other sensors such as temperature, humidity, pressure, light, vibration, precipitation, etc. sensors could be included in the system to provide information regarding the cargo and/or its environment. The cargo compartment 2004 is located in the bay of the trailer and the access point 2008 is the pair of doors at one end of that trailer. These doors are usually configured such that one overlaps the other making it necessary to open that door first and then the other door. One door typically includes a manually lockable handle and/or hardware to mount a separate lock in such a way as to secure the doors. But, other types of doors and/or access points are within the scope of the current disclosure.

Moreover, the controller 2010 of the current embodiment is shown as a separate component. But again, it could be integrated with other components notably the geo-positioning circuit 1912 and/or the lock. It is also shown mounted on a side wall of the trailer although it could be mounted on the floor, in a "mother's attic" (for moving vans), on the roof, underneath, etc. if desired. In the current embodiment, the geo-positioning circuit 2012 is mounted on the roof of the trailer and is also secured to the trailer in a manner that would make attempts to tamper with and/or remove it detectable as disclosed elsewhere herein. Its location also provides it with a relatively good vantage point at which it can send/receive signals to/from a telecommunications system and/or a geo-positioning system. Its location also shields it from casual observation by those who might not be aware of the presence of the system 2000.

The lock 2014 of the current embodiment is a solenoid-bolt-operated lock although other types of locks are within the scope of the disclosure. For instance, a DC motor, stepper motor, or other actuation device could drive the lock. And, of course, it could be spring loaded or otherwise biased into a default position such as the locked position. The lock 2014 of the current embodiment could be provided with the system 2000 although pre-existing locks could be wired into the system if desired. Moreover, it is shown as being mounted on the second-opening door of the trailer and inside thereof although that need not be the case. This position, though, would almost force an unauthorized user to somehow open the first-opening door and then at least partially enter the cargo compartment 2004 before they could tamper with the lock 2014. Nonetheless the lock 2014 could include or be outfitted with a position indicator or switch so that the controller 2010 could sense an unexpected (or otherwise) movement of the lock 2014 and/or its bolt. Should that event occur (for instance, the switch or other bolt status sensor indicates un-commanded movement), the controller 2010 could be configured to send a command to the lock 2014 to try to lock itself and could send a signal to the geo-positioning circuit 2012 (and/or control center) indicative of the event.

Systems of some embodiments rely on the manual lock ordinarily supplied on the doors of most vehicles. The system includes a locking pin sufficiently strong that attempts to force the lock do not damage it enough that it would not be likely to release or break. In such embodiments, the controller would operate the locking pin with the user supplying the force to open the manual lock. Thus, instead of developing enough power to overcome the friction, inertia, etc. associated with the manual lock, the controller would produce enough power to operate the relatively smaller locking pin.

FIG. 20 also shows one half of a cargo switch or a switch halve 2018. Another switch halve of the current embodiment is located on the other side of the truck and/or door although it is not visible in FIG. 20. The switch halves 2018 can be fashioned from and/or mechanically coupled to a sturdy cable such as one made of stranded metal or some other material resistant to cutting, burning, snapping, and/or other forms of destructive activity that might somehow sever it. Of course the cable could be replaced with or augmented with a sturdy bar, rod, etc. in various embodiments. Moreover, the cables can be of a length sufficient to reach across the access point 2008 with minimal slack. The switch halve 2018 can also include (or be connected to) a wire (or some wireless transmitter) so that the controller 2010 can sense the state of the switch (the two halves in combination). The switch sensing mechanism may include: RFID sensors, infrared sensors, proximity sensors, Hall effect sensors, optical sensors, etc. Note that one switch halve 1218 would be a male component and the other would be a female component in embodiments so that the two halves can be drawn together and mated. Since the switch halves are mechanically coupled to opposite sides of the access point 2008, doing so would necessarily involve closing the doors and any opening of the doors (absent significant structural damage thereto) would necessarily involve disconnecting, de-mating, or otherwise separating the two switch halves 1218. That action could be sensed by the controller 2010 thereby raising an alarm or at least sending an appropriate signal to the geo-positioning circuit 2012 and/or control center.

System 2000 of the current embodiment also includes the camera 2022 and could include additional cameras. The camera can be positioned to view the access point 2008 and/or other locations at which users (including authorized and unauthorized) users and/or third parties might attempt access/entry into the cargo compartment 2004. Moreover, a camera 2022 could be positioned on the outside of the trailer with a view of the surrounding environment. Further still, a camera 2022 could be positioned in the cab and/or with a view of the cargo. These cameras can be mounted securely so that tampering with them would be evident as with other components of system 2000. These cameras 2022 can also be configured to communicate with the controller 2010 and/or geo-positioning circuit 2012 by various means as disclosed elsewhere herein. They can also be configured to communicate with the control center via a telecommunications network such as a cellular telephony system.

In some embodiments, the controller 2010 could be configured to generate a signal upon detection of an unusual event that would cause the cameras 2022 to capture an image of the scene they view at the time of the event. The cameras could also be configured to transmit those images to the controller 2010, the geo-positioning circuit 2012, the control center etc. And, if desired, those images can be time, date, and/or location stamped and can be associated with some sort of event identifier. In some systems the cameras are light activated so that an opening of the access point would be detected via ambient light that might illuminate the cargo area. In the current embodiment, therefore, when an event and/or incident occurs, contemporaneous images of the areas near the access point, the trailer, the cab, the cargo etc. can be obtained, preserved, stored, etc. for immediate and/or subsequent review. In some instances, the cameras are activated upon signal requested from the Geo positioning circuit and/or control center. Moreover, when the controller of the current embodiment detects a change of state of the switch, it sends a signal to activate the camera(s).

Therefore, it seems likely that an image of the user, third party, perpetrator, and/or others who might be present would be obtained. Images of the state of the cargo at the time of the event might also be obtained in this way. Note that the cameras 2022 could even, or instead be activated on some (a) periodic schedule and even upon authorized entries. In systems of such embodiments, the state of the cargo would be known better than with heretofore available systems.

Indeed, photos of the cargo can be obtained at the beginning of each (un)loading event and compared to determine whether the appropriate amount of cargo was (un)loaded. Moreover, the appearance of unauthorized cargo, passengers, etc. could be identified and reported.

FIG. 21 illustrates an installed anti-theft controller. The controller 2110 of the current embodiment is an integrated one with both control and geo-positioning capabilities resident therein and it happens to be mounted securely to a sturdy vehicle panel 212 that is rugged enough to withstand likely attempts to penetrate, damage, or destroy it. Moreover, the controller (or its enclosure) has a similarly sturdy flange 2114 which defines a number of fastener holes. FIG. 21 shows several fasteners 2116 and 2118 such as bolts and nuts securing the controller 2110 to the vehicle panel 2112 by way of the flange 2114. These fasteners 21116 and 2118 can be of a type requiring specialized, rare, and/or customized tools to fasten and/or unfasten them. In that fashion (and/or other fashions) unauthorized parties without those tools would find it difficult to remove the controller 2110 from the vehicle panel 2112. Moreover, these fasteners 2116 and 2118 could be safety wired, coated, painted, etc. once installed to allow for ready detection of attempts to unfasten them from the controller 2110 and/or vehicle panel 2112. That detection would be by way of determining whether the safety wire was intact and/or the coating, paint, etc. is scratched. Thus, the current embodiment provides a controller 2110 that if tampered with would bear evidence of the same.

Figure 22:
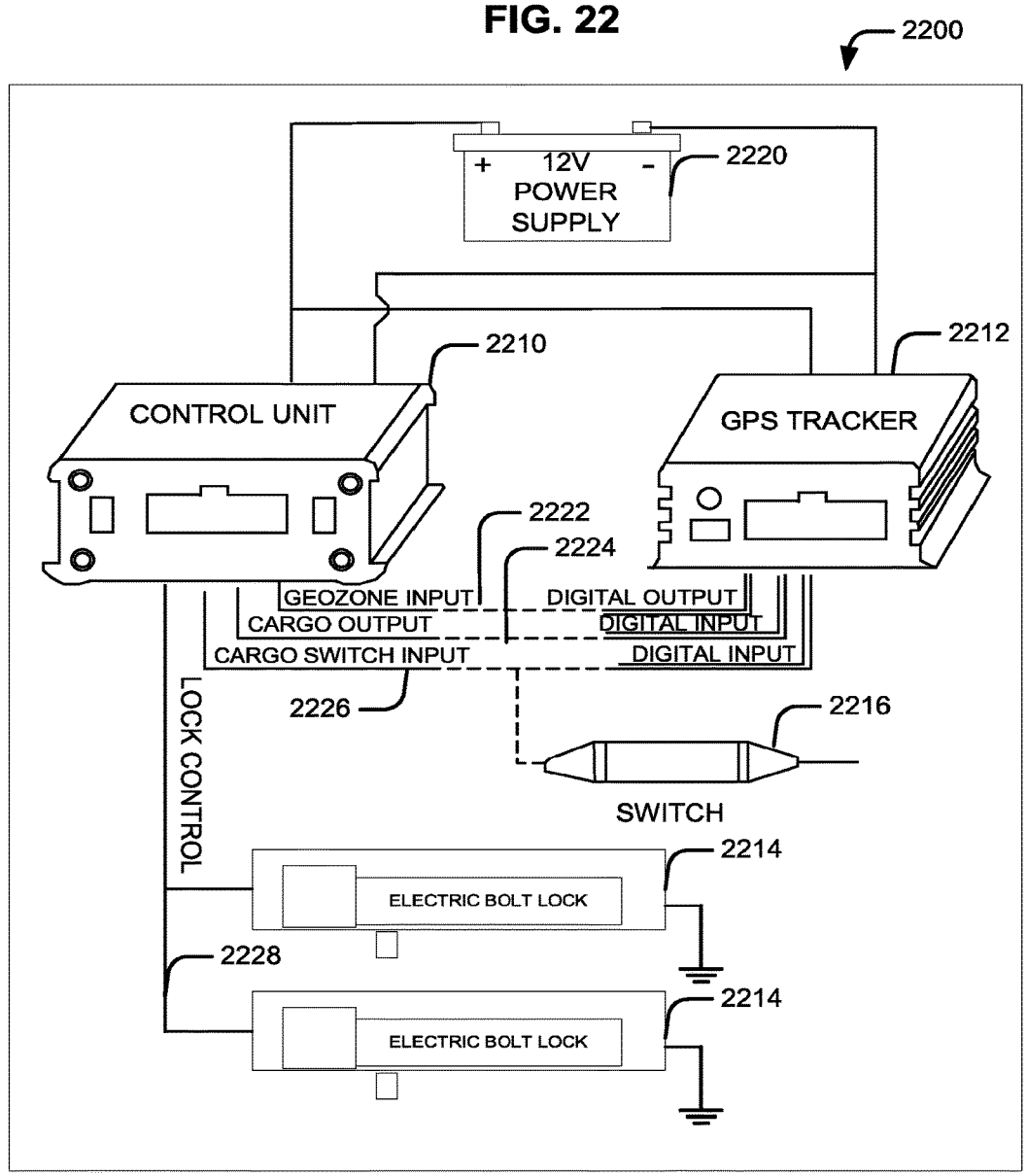
FIG. 22 schematically illustrates a cargo anti-theft system.

FIG. 22 schematically illustrates a cargo anti-theft system. The system of the current embodiment includes a controller 2210, a geo-positioning circuit 2212, a lock 2214, a cargo switch 2216, a battery 2220, a geozone input 2222, a cargo output 2224, and a cargo switch input 2226. FIG. 22 shows that the controller 2210 of the current embodiment communicates with the cargo switch 2216 and a pair of locks 2214. It is powered by a separate battery 2220 as is the geo-positioning circuit 2212. It also communicates with the geo-positioning circuit 2212 by way of three signals: the geozone input 2222, the cargo output 2224, and the cargo switch input 2226. The geo-positioning circuit generates the geozone output to indicate to the controller 2210 that the system 2200 is (or is not) in an authorized geozone. The controller 2210 senses the state of the cargo switch 2216 via the cargo switch input 2226 as does the geo-positioning circuit. Although, one or the other of these two devices could sense it in embodiments. Moreover, FIG. 22 illustrates that the controller 2210 generates the cargo output 2224 signal which indicates that access is occurring (or has occurred) and which is sensed by the geo-positioning circuit 2212. Additionally, in the current embodiment, the controller generates a common lock control signal 2228 which it uses to control the locks 2214 although separately activated locks could be provided in embodiments.

With further reference to FIG. 22, note that many geo-positioning circuits include onboard batteries. These batteries can be selected such that they supply a longer operating period then the battery 2220 (whether internal to the controller 2210 or external). In this manner, the geo-positioning circuit can continue to operate even after the battery 2220 discharges and renders the controller 2210 inoperable. When such events occur, the geo-positioning circuit 2212 can continue reporting the geo location of the system 2200 and any data that it might be able to obtain from, for instance, the cargo switch input 2226 and/or various cameras.

Figure 23:
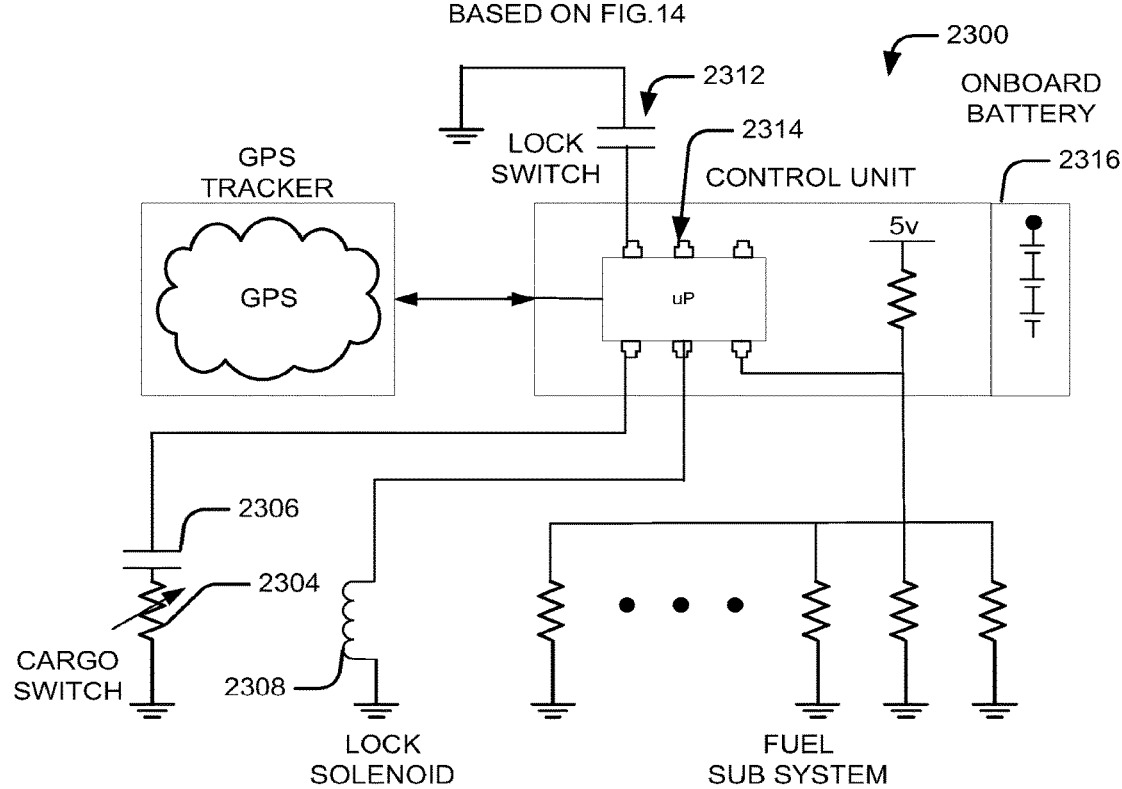
FIG. 23 schematically illustrates another cargo anti-theft system.

FIG. 23 schematically illustrates another cargo anti-theft system. In the current embodiment, the control unit 2300 includes both fuel and cargo protection-related circuits. More specifically, the control unit 2300 includes and/or communicates with a cargo switch 2304, a resistor 2306, a lock solenoid 2308, a lock switch 2312, and a battery 2316. The cargo switch is illustrated as a pair of normally open contacts although it can be made from two switch halves as disclosed elsewhere herein. Note that the control unit 2300 senses the cargo switch 2304 through the voltage dividing variable resistor 2306 such that the voltage sensed at the control unit 2300 can be set by the user. In the current embodiment, the value of the resistor 2306 can be programmed via the control unit 2300 over a telecommunications system (for instance, by a user in the control center). Accordingly, the control unit 2300 can be configured to generate a cargo switch-related signal if the voltage it senses at its input is incorrect (and/or off by more than some pre-determined amount). Thus, if a third party attempts to mimic the presence of a closed cargo switch at that input of the control unit 2300 with a voltage supply, the control unit 2300 is likely to detect an anomalous event and raise a corresponding signal.

Note also that the control unit 2300 senses the position of the lock via lock switch 2312. While lock switch 2312 is indicated as a switch, any type of position sensor could be used for that component. For instance, a linear resistor position indicator could be used. The control unit 2300 of the current embodiment also drives the lock solenoid 2308. Thus, it can control the (commanded) position of one or more locks. The control unit 2300 also includes an onboard battery 2316. Thus, it can operate independently of a vehicle power supply at least for some time. And, for outside mounted components, a solar panel could be provided to power such components and/or the system.

FIG. 24 illustrates a cargo switch and a pair of cab to trailer connectors. The switch halves 2402 and 2404 (of the cable switch 2400) are shown mechanically coupled to a corresponding pair of cables 2406 and wires 2408. One switch half 2402 is male while the other is female in the current embodiment. FIG. 24 also illustrates a pair of cab to trailer switch halves 2410 and 2412 one of which is male and the other of which is female. These switch halves 2410 and 2412 can be used to connect trailer-located components of various embodiments to cab-located components.

With reference again to FIG. 12, note that method 1200 can include monitoring the cargo anti-theft controllers, geo-positioning circuits, cargo switches, lock switches, cameras, systems, etc. disclosed herein. Thus, embodiments provide cargo anti-theft systems, sensors, controllers, etc. which allow for the monitoring of vehicle cargo compartment for potential tampering and/or cargo theft. Some such systems allow for discreet, unobtrusive, and potentially unsuspected cargo monitoring. In some embodiments, the sensors, controllers, systems, etc. are reliable, rugged, and relatively inexpensive to install and/or operate. Systems of some embodiments allow users to investigate potential cargo-theft events remotely and to implement corrective actions.

CONCLUSION

Although the subject matter has been disclosed in language specific to structural features and/or methodological acts, it is to be understood that the subject matter defined in the appended claims is not necessarily limited to the specific features or acts disclosed above. Rather, the specific features and acts described herein are disclosed as illustrative implementations of the claims.

What is claimed is:

1. A cargo anti-theft protection controller comprising:
a cargo switch input configured to sense a ground of a cargo vehicle through a cargo switch;
a geo-zone input;
an output configured to be in communication with an electronically operated lock; and
a circuit in communication with the cargo switch input, the geo-zone input, and the output, the circuit being configured to:
detect an opening of the cargo switch via a pre-selected voltage at the cargo switch input and, responsive thereto, to activate the lock to lock via the output;
output a signal via the output to unlock the lock only in pre-selected geozones; and
detect a PIN (personal identification number) by sensing a sequence of openings and closings of the cargo switch and interpret the sequence of openings and closings of the cargo switch as the PIN;
wherein the cargo switch is mechanically coupled to a cargo access point on the cargo vehicle in such a manner that the cargo access point cannot be opened without first opening the cargo switch; and
wherein detection of the PIN indicates an authorized entry to the cargo access point.

2. The controller of claim 1 further comprising a geo-positioning output in communication with the circuit, the circuit being further configured to output a signal indicative of the opening of the cargo switch via the geo-positioning output.

3. The controller of claim 1 wherein the pre-selected voltage differs from 12 VDC.

4. The controller of claim 1 further comprising a user input configured to accept a user-selected voltage, the controller being further configured to change the pre-selected voltage to the user-selected voltage.

5. The controller of claim 1 further comprising a mechanical coupler configured to securely couple the controller to the cargo vehicle.

6. The controller of claim 1 further comprising a lock position input and wherein the controller is further configured to sense a position of the lock via the lock position input and to sense whether the lock position input is electronically open.

7. The controller of claim 6 further wherein the controller is further configured to output a signal indicative that the lock should lock responsive to the position of the lock.

8. The controller of claim 1 further comprising a battery configured to power the controller.

9. The controller of claim 1 wherein the controller is further configured to change the PIN (Personal Identification Number) associated with openings and closings of the cargo switch.

10. An anti-theft protection system comprising: a controller further comprising:
a cargo switch input configured to sense a ground of a cargo vehicle through a cargo switch, the cargo switch in electrical communication with the cargo switch input;
a geo-zone input;
an output configured to be in communication with an electronically operated lock; and
a circuit in communication with the cargo switch input, the geo-zone input, and the output, the circuit being configured to:
detect an opening of the cargo switch via a pre-selected voltage at the cargo switch input and, responsive thereto, to activate the lock to lock via the output;
output a signal via the output to unlock the lock only in pre-selected geozones; and
detect a PIN (personal identification number) by sensing a sequence of openings and closings of the cargo switch and interpret the sequence of openings and closings of the cargo switch as the PIN;
the electronically operated lock in communication with the output; and
a mechanical coupling wherein the cargo switch is mechanically coupled to a cargo access point on the cargo vehicle in such a manner that the cargo access point cannot be opened without first opening the cargo switch;
wherein detection of the PIN indicates an authorized entry to the cargo access point.

11. The system of claim 1 further comprising a geo-positioning output in communication with the circuit, the circuit being further configured to output a signal indicative of the opening of the cargo switch via the geo-positioning output.

12. The system of claim 1 wherein the pre-selected voltage differs from 12 VDC.

13. The system of claim 1 further comprising a user input configured to accept a user-selected voltage, the controller being further configured to change the pre-selected voltage to the user-selected voltage.

14. The system of claim 1 further comprising a mechanical coupler configured to securely couple the controller to the cargo vehicle.

15. The system of claim 1 further comprising a lock position input and wherein the controller is further configured to sense a position of the lock via the lock position input.

16. A method of protecting cargo comprising:
sensing a ground of a cargo vehicle through a cargo switch;
using a circuit in communication with the cargo switch to detect an opening of the cargo switch via a pre-selected voltage;
responsive to detecting the opening of the cargo switch, using the circuit to activate a lock positioned at a cargo access point on the cargo vehicle to lock;
wherein the cargo switch is mechanically coupled to the cargo access point in such a manner that the cargo access point cannot be opened without first opening the cargo switch;
outputting a signal indicative of the opening of the cargo switch to a geo-positioning circuit in communication with the circuit;
sensing a geo-zone input with the circuit and outputting a signal to unlock the lock only in pre-selected geozones;
detecting a PIN (personal identification number) with the circuit by sensing a sequence of openings and closings of the cargo switch and interpreting the sequence of openings and closings of the cargo switch as the PIN, wherein detection of the PIN indicates an authorized entry to the cargo access point.

* * * * *